(12) United States Patent
Datta et al.

(10) Patent No.: US 12,246,841 B2
(45) Date of Patent: Mar. 11, 2025

(54) ELECTRIC POWER SYSTEM FOR A VEHICLE

(71) Applicant: General Electric Company, Schenectady, NY (US)

(72) Inventors: Rajib Datta, Niskayuna, NY (US); Vishnu Mahadeva Iyer, Niskayuna, NY (US); Mohamed Osama, Garching (DE); Kum Kang Huh, Niskayuna, NY (US); Vandana Prabhakar Rallabandi, Niskayuna, NY (US)

(73) Assignee: General Electric Company, Evendale, OH (US)

( * ) Notice: Subject to any disclaimer, the term of this patent is extended or adjusted under 35 U.S.C. 154(b) by 58 days.

(21) Appl. No.: 18/353,192

(22) Filed: Jul. 17, 2023

(65) Prior Publication Data
US 2023/0356849 A1    Nov. 9, 2023

Related U.S. Application Data

(63) Continuation of application No. 17/738,165, filed on May 6, 2022, now abandoned, which is a continuation
(Continued)

(51) Int. Cl.
*B64D 27/02*    (2006.01)
*B64D 27/10*    (2006.01)
(Continued)

(52) U.S. Cl.
CPC ............. *B64D 27/02* (2013.01); *B64D 27/10* (2013.01); *B64D 27/16* (2013.01); *B64D 27/24* (2013.01);
(Continued)

(58) Field of Classification Search
CPC ........ B64D 27/02; B64D 27/10; B64D 27/24; B64D 27/026; B64D 2221/00; H02K 7/1823; H02J 1/10
See application file for complete search history.

(56) References Cited

U.S. PATENT DOCUMENTS 6,490,181 B1    12/2002    Liu et al.
7,545,656 B2    6/2009     Lanni
(Continued)

FOREIGN PATENT DOCUMENTS

| CA | 29707376 A1 | 2/2018 |
| CN | 201323512 Y | 10/2009 |
| GB | 2456336 A | 7/2009 |

OTHER PUBLICATIONS

Zhang et al., Development of Megawatt-Scale Medium Voltage High Efficiency High Power Density Power Converters for Aircraft Hybrid-Electric Propulsion Systems, AIAA Propulsion and Energy Forum, 2018 AIAA/IEEE Electric Aircraft Technologies Symposium, Jul. 9-11, 2018, Cincinnati, OH, 5 Pages.
(Continued)

*Primary Examiner* — Pedro J Cuevas
(74) *Attorney, Agent, or Firm* — Dority & Manning, P.A.

(57) ABSTRACT

An electric power system for a vehicle includes at least one electric machine, one or more power rectifiers, and a plurality of DC channels. The at least one electric machine includes a plurality of tooth-wound multi-phase windings that are substantially magnetically decoupled, and the at least one electric machine is mechanically balanced even if one of the plurality of windings is de-energized. The one or more power rectifiers are configured to produce rectified power from the power generated by the at least one electric machine. The plurality of DC channels are formed after the
(Continued)

at least one power rectifier and are configured to provide DC power to one or more loads within a vehicle.

14 Claims, 8 Drawing Sheets

Related U.S. Application Data of application No. 16/924,785, filed on Jul. 9, 2020, now Pat. No. 11,325,714.

(51) Int. Cl.
| | | |
|---|---|---|
| *B64D 27/16* | (2006.01) | |
| *B64D 27/24* | (2024.01) | |
| *H02J 1/10* | (2006.01) | |
| *H02K 7/18* | (2006.01) | |
| *H02K 11/04* | (2016.01) | |

(52) U.S. Cl.
CPC .............. *H02J 1/10* (2013.01); *H02K 7/1823* (2013.01); *H02K 11/04* (2013.01); *B64D 27/026* (2024.01); *B64D 2221/00* (2013.01)

(56) References Cited

U.S. PATENT DOCUMENTS

| | | | |
|---|---|---|---|
| 7,638,890 B2 | 12/2009 | Lando et al. | |
| 7,671,484 B2 | 3/2010 | Raulin et al. | |
| 7,898,827 B2 | 3/2011 | Ganev et al. | |
| 8,222,792 B2 | 7/2012 | Platon et al. | |
| 8,492,920 B2 | 7/2013 | Huang et al. | |
| 8,575,817 B2 | 11/2013 | Platon et al. | |
| 8,670,250 B2 | 3/2014 | Fu et al. | |
| 8,729,844 B2 | 5/2014 | Feng et al. | |
| 8,745,990 B2 | 6/2014 | Burkholder et al. | |
| 8,754,562 B2 | 6/2014 | Platon et al. | |
| 8,766,490 B2 | 7/2014 | Capps | |
| 9,045,996 B2 | 6/2015 | Anghel et al. | |
| 9,096,312 B2 | 8/2015 | Moxon | |
| 9,097,134 B2 | 8/2015 | Ferch et al. | |
| 9,379,659 B2 | 6/2016 | Mullin | |
| 9,425,686 B2 | 8/2016 | Zheng et al. | |
| 9,621,090 B2 | 4/2017 | Chong et al. | |
| 9,982,555 B2 | 5/2018 | Thet et al. | |
| 10,029,631 B2 | 7/2018 | Iwashima et al. | |
| 10,090,676 B2 | 10/2018 | Knowles et al. | |
| 10,263,550 B2 | 4/2019 | Thet et al. | |
| 10,443,504 B2 | 10/2019 | Dalal | |
| 10,454,278 B2 | 10/2019 | Gao | |
| 10,493,930 B2 | 12/2019 | Shander et al. | |
| 10,693,403 B2 | 6/2020 | Zhang et al. | |
| 10,759,540 B2 | 9/2020 | Long | |
| 10,759,545 B2 * | 9/2020 | Schwarz ................ F02C 6/20 | |
| 10,822,099 B2 | 11/2020 | Barone et al. | |
| 10,826,408 B2 * | 11/2020 | Tarkiainen .............. B60L 53/24 | |
| 10,906,657 B2 * | 2/2021 | Schwarz .............. H02K 7/1823 | |
| 11,101,688 B2 * | 8/2021 | Halsey ...................... H02J 3/46 | |
| 11,108,349 B1 | 8/2021 | Vanevenhoven et al. | |
| 11,142,332 B2 * | 10/2021 | Compton .................. H02J 4/00 | |
| 11,325,714 B2 | 5/2022 | Datta et al. | |
| 11,396,238 B2 * | 7/2022 | Pfeilschifter ........... B60L 53/14 | |
| 11,462,937 B2 * | 10/2022 | Halsey ................... B64D 31/00 | |
| 2005/0280964 A1 | 12/2005 | Richmond et al. | |
| 2008/0298103 A1 | 12/2008 | Bendre et al. | |
| 2010/0007225 A1 | 1/2010 | Platon et al. | |
| 2010/0251726 A1 | 10/2010 | Jones et al. | |
| 2011/0198955 A1 | 8/2011 | Platon et al. | |
| 2012/0187893 A1 | 7/2012 | Baba et al. | |
| 2012/0242171 A1 | 9/2012 | Capps | |
| 2012/0262023 A1 | 10/2012 | Platon et al. | |
| 2013/0088017 A1 | 4/2013 | Jia et al. | |
| 2014/0125121 A1 | 5/2014 | Edwards et al. | |
| 2015/0100180 A1 | 4/2015 | Oyori et al. | |
| 2015/0183385 A1 | 7/2015 | Iwashima et al. | |
| 2016/0059710 A1 | 3/2016 | Richey et al. | |
| 2016/0280394 A1 | 9/2016 | Radun | |
| 2017/0166248 A1 | 6/2017 | Asao et al. | |
| 2017/0338756 A1 | 11/2017 | Jung | |
| 2018/0112599 A1 | 4/2018 | Dalal | |
| 2018/0141674 A1 | 5/2018 | Bailey et al. | |
| 2018/0291807 A1 | 10/2018 | Dalal | |
| 2019/0149065 A1 * | 5/2019 | Tarkiainen ................ H02J 7/00 | |
| | | | 318/504 |
| 2019/0149078 A1 | 5/2019 | Sumasu et al. | |
| 2019/0173411 A1 | 6/2019 | Jung | |
| 2019/0382123 A1 * | 12/2019 | Schwarz .............. H02K 7/1823 | |
| 2019/0386510 A1 * | 12/2019 | Halsey ................... H02J 9/062 | |
| 2020/0017225 A1 * | 1/2020 | Chung ................. B64D 27/02 | |
| 2020/0017232 A1 * | 1/2020 | Compton ............... H02J 7/0025 | |
| 2020/0025094 A1 | 1/2020 | Dalal | |
| 2020/0055411 A1 * | 2/2020 | Pfeilschifter ............. H02J 7/02 | |
| 2021/0207544 A1 | 7/2021 | Muldoon | |
| 2021/0297024 A1 | 9/2021 | Vanevenhoven et al. | |
| 2021/0297025 A1 | 9/2021 | Vanevenhoven et al. | |
| 2021/0359539 A1 * | 11/2021 | Halsey ................... B64D 31/18 | |
| 2021/0371116 A1 | 12/2021 | Cartwright | |
| 2021/0403135 A1 | 12/2021 | Schulz et al. | |
| 2022/0009643 A1 | 1/2022 | Datta et al. | |
| 2023/0130278 A1 | 4/2023 | Huh et al. | |
| 2023/0356849 A1 * | 11/2023 | Datta ....................... F02C 7/32 | |

OTHER PUBLICATIONS

Zhang et al., A Megawatt-Scale Medium-Voltage High Efficiency High Power Density "SiC+Si" Hybrid Three-Level ANPC Inverter for Aircraft Hybrid-Electric Propulsion Systems, IEEE, 2018, pp. 806-813.

* cited by examiner

ELECTRIC POWER SYSTEM FOR A VEHICLE

CROSS-REFERENCE TO RELATED APPLICATION

This application is a continuation of U.S. application Ser. No. 16/924,785, filed Jul. 9, 2020, and is a continuation of U.S. application Ser. No. 17/738,165, filed May 6, 2022, both of which are hereby incorporated by reference in their entirety.

FIELD

The present subject matter relates generally to a vehicle electrical system, and more particularly to a vehicle electric power system having at least one electric machine and multiple DC channels for powering a vehicle load.

BACKGROUND

A conventional commercial aircraft generally includes a fuselage, a pair of wings, and a propulsion system that provides thrust. The propulsion system typically includes at least two aircraft engines, such as turbofan jet engines. Each turbofan jet engine is mounted to a respective one of the wings of the aircraft, such as in a suspended position beneath the wing, separated from the wing and fuselage.

More recently, propulsion systems have been proposed of a hybrid-electric design. With these propulsion systems, an electric power source may provide electric power to an electric fan to power the electric fan. Electric power systems capable of providing this electric power while maintaining a robustness and a redundancy in design would be beneficial.

BRIEF DESCRIPTION

Aspects and advantages of the invention will be set forth in part in the following description, or may be obvious from the description, or may be learned through practice of the invention.

In one exemplary embodiment of the present disclosure, a vehicle electric power system includes at least first and second electric machines, a first electrical channel, and a second electrical channel. Each electric machine includes a plurality of multi-phase windings that are substantially magnetically decoupled. Each electric machine is mechanically balanced even if one of the plurality of windings is de-energized. The first electrical channel couples the first electric machine to a first electrical power bus and to a second electrical power bus. The second electrical channel couples the second electric machine to the first electrical power bus and to the second electrical power bus. Multiple DC channels for the vehicle electric power system are formed at least in part by the first electrical power bus and the second electrical power bus.

In another exemplary embodiment of the present disclosure, a vehicle electric power system includes a gas turbine engine, an LP electric machine, and an HP electric machine. The gas turbine engine includes a low pressure turbine and a low pressure compressor rotatable with one another through a low pressure shaft and a high pressure turbine and a high pressure compressor rotatable with one another through a high pressure shaft. The LP electric machine is rotatable with the low pressure shaft, and includes a passive rectifier assembly for providing a first power flow. The HP electric machine is rotatable with the high pressure shaft, and is coupled to an active rectifier assembly for providing a second power flow.

Another exemplary embodiment of the present disclosure concerns a method for generating electric power for a vehicle. The method includes generating a first power flow at a first electric machine. The method also includes passively rectifying the first power flow generated by the first electric machine. The method also includes generating a second power flow at a second electric machine. The method also includes actively rectifying the second power flow generated by the second electric machine. The method also includes coupling passively rectified first power from the first electric machine to at least first and second DC channels. The method also includes coupling actively rectified second power from the second electric machine to the at least first and second DC channels. The method also includes powering one or more loads within a vehicle with DC voltages provided by the first and second DC channels.

In another exemplary embodiment of the present disclosure, a vehicle electric power system includes at least one electric machine, one or more power rectifiers, and a plurality of electrical power busses. The at least one electric machine comprising a plurality of tooth-wound multi-phase windings that are substantially magnetically decoupled, wherein the at least one electric machine is mechanically balanced even if one of the plurality of windings is de-energized. The one or more power rectifiers are for producing rectified power from the power generated by the at least one electric machine. The plurality of electrical power busses are formed after the at least one power rectifier, and are configured to provide DC power to one or more loads within a vehicle.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
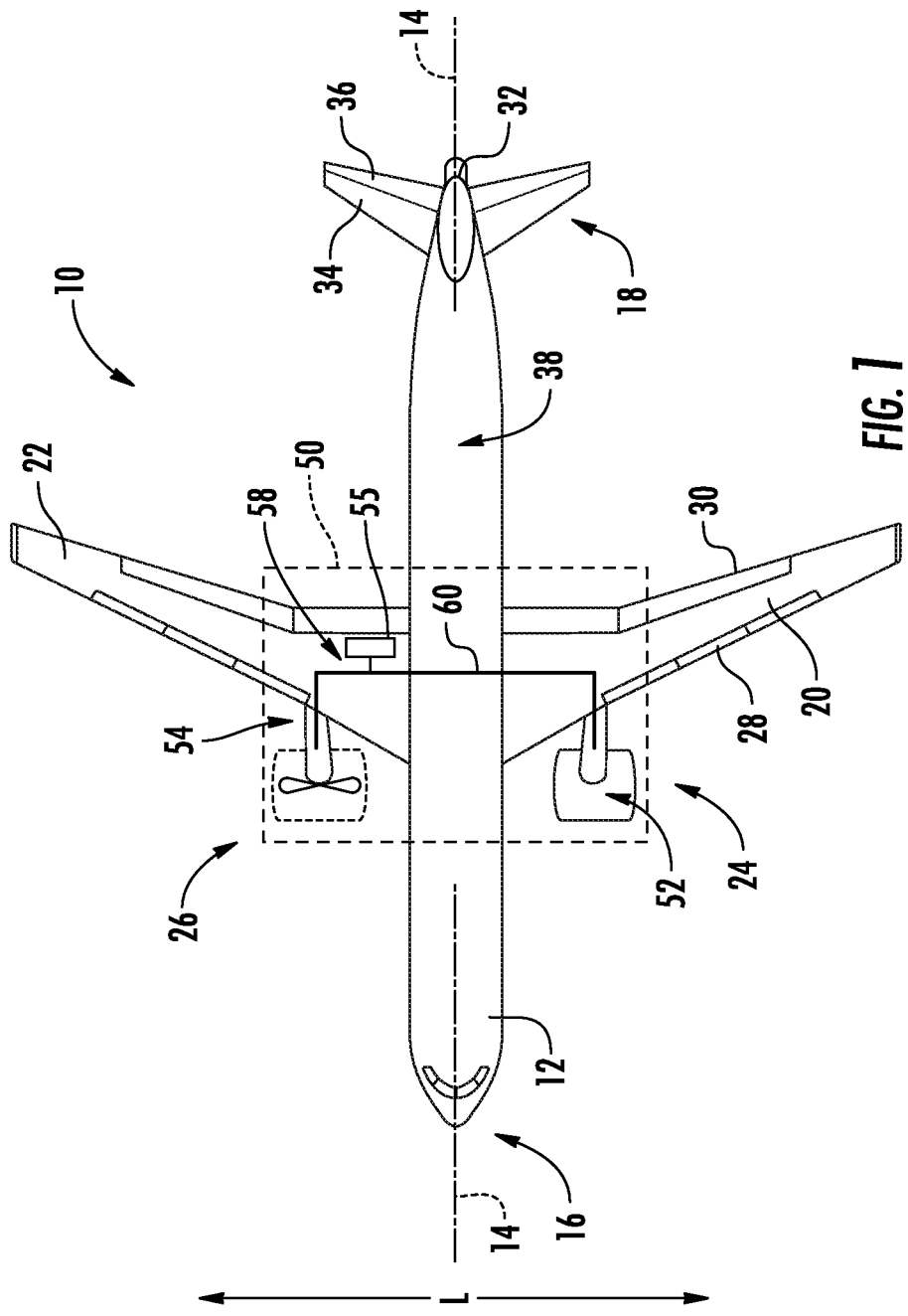
FIG. 1 is a top view of an aircraft according to various exemplary embodiments of the present disclosure.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

As used herein, the terms "first", "second", and "third" may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to a flow in a pathway. For example, with respect to a fluid flow, "upstream" refers to the direction from which the fluid flows, and "downstream" refers to the direction to which the fluid flows. However, the terms "upstream" and "downstream" as used herein may also refer to a flow of electricity.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to a value being within a +/−1, 2, 4, 10, 15, or 20 percent margin in either individual values, range(s) of values and/or endpoints defining range(s) of values.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

The subject technology is generally directed to various architectures for an electric power system, such as an electric power system configured to supply power in an aircraft. For instance, power can be reliably generated and supplied during normal steady-state operation as well as under fault conditions in order to generate thrust in a propulsion assembly of an aircraft. Power generation can employ two electric machines (e.g., an LP generator and an HP generator) to supply engine and aircraft loads, one rotatable with an LP shaft/spool and one rotatable with an HP shaft/spool. The various configurations can be adapted to provide for high power density packaging within an aircraft engine at different voltage levels of a DC bus (e.g., ±270 V, ±1200 V or other high voltage levels (e.g., in a bipolar voltage range of between about +/−270 and about +/−2,400 volts, or in a unipolar voltage range of between about 270 volts and 4800 volts)), in order to optimize overall system weight, size, efficiency, and reliability. In some embodiments the voltage levels for the DC bus may be a unipolar or bipolar voltage and between 270 and 800, below 270, between 600 and 1200, about 800, about 1200, between 800 and 1600, between 1200 and 2400, about 1600, about 2600, about 3000, between 2400 and 3000, about 4800, between 3000 and 4800, and/or above 4800 in order to optimize overall system weight, size, efficiency, and reliability.

The ability to advantageously balance power density and performance with weight, size, efficiency, and reliability can be especially advantageous for applications including but not limited to narrow body aircraft engines. Notably, as used herein, the term "LP generator" and "HP generator" simply refers to the components of an engine the generator is associated with, and does not necessarily imply any specific characteristics of the electric machine.

Electric power systems as described herein can include first and second electric machines as well as a power distribution system (PDU) that is configured as a dual bus system including first and second independent electrical power buses. Each electrical power bus can electrically connect and provide an independent source of DC power to a separate aircraft engine or other load (e.g. to an electric propulsion assembly). The dual bus system is designed to add a level of redundancy to the electric power system. If a fault occurs within an electric machine connection, internal to an electric machine, in electrical cables, in a power converter, or in another location, one of the electrical power buses (or one inverter channel associated with a single bus) can be taken offline while the other inverter channels or electrical power bus(es) continue to operate. Such electric power system configurations afford the capability of running full aircraft load with one of the inverter channels or electrical power buses being offline. Power flow thus can be advantageously managed within an electric power system without causing disruption to the system.

In addition to providing two independent electrical channels, the channels are configured to be magnetically balanced to avoid mechanical forces that would otherwise occur in the event of unbalanced magnetic pull caused by magnetic flux being generated in only a portion of an electric machine. Magnetic balancing can be achieved by providing first and second independent inverter channels within each electrical channel of an electric power system, along with specific configurations within the winding-inverter connections of an electric machine. These features can be designed so that the electric channels within the electric power systems remain magnetically balanced and mechanically stable.

In some embodiments, additional improvements can be made to the size, weight and efficiency of an electric power system. One option for achieving such additional improvements is by co-locating converters with a power distribution unit. For instance, providing an LP converter, HP converter, and first and second electrical power buses within the same PDU assembly can substantially reduce or eliminate the amount and number of cables and DC common-mode filtering that might otherwise be needed within an electric power system. Another option for achieving such additional improvements is to eliminate an LP converter by including a diode-rectifier configuration at the LP machine. A capacitor configuration can also be included at the LP machine for generating reactive power. Elimination of an LP converter by including a capacitor-diode rectifier at the LP machine is possible when power flow occurs only from the LP machine to the HP machine and not from the HP machine to the LP machine. Such option helps provide high power quality, low stress on the LP generator insulation, and reduced/eliminated need for common mode filtering on the DC cable(s) from an LP generator without oversizing the machine.

Referring now to the drawings, wherein identical numerals indicate the same elements throughout the figures, FIG. 1 provides a top view of an exemplary aircraft 10 as may incorporate various embodiments of the present disclosure. As shown in FIG. 1, the aircraft 10 defines a longitudinal centerline 14 that extends therethrough, a lateral direction L, a forward end 16, and an aft end 18. Moreover, the aircraft 10 includes a fuselage 12, extending longitudinally from the forward end 16 of the aircraft 10 to the aft end 18 of the aircraft 10, and a wing assembly including a port side and a starboard side. More specifically, the port side of the wing assembly is a first, port side wing 20, and the starboard side of the wing assembly is a second, starboard side wing 22. The first and second wings 20, 22 each extend laterally outward with respect to the longitudinal centerline 14. The first wing 20 and a portion of the fuselage 12 together define a first side 24 of the aircraft 10, and the second wing 22 and another portion of the fuselage 12 together define a second side 26 of the aircraft 10. For the embodiment depicted, the first side 24 of the aircraft 10 is configured as the port side of the aircraft 10, and the second side 26 of the aircraft 10 is configured as the starboard side of the aircraft 10.

Each of the wings 20, 22 for the exemplary embodiment depicted includes one or more leading edge flaps 28 and one or more trailing edge flaps 30. The aircraft 10 further includes a vertical stabilizer 32 having a rudder flap (not shown) for yaw control, and a pair of horizontal stabilizers 34, each having an elevator flap 36 for pitch control. The fuselage 12 additionally includes an outer surface or skin 38. It should be appreciated however, that in other exemplary embodiments of the present disclosure, the aircraft 10 may additionally or alternatively include any other suitable configuration. For example, in other embodiments, the aircraft 10 may include any other configuration of stabilizer.

Figure 2:
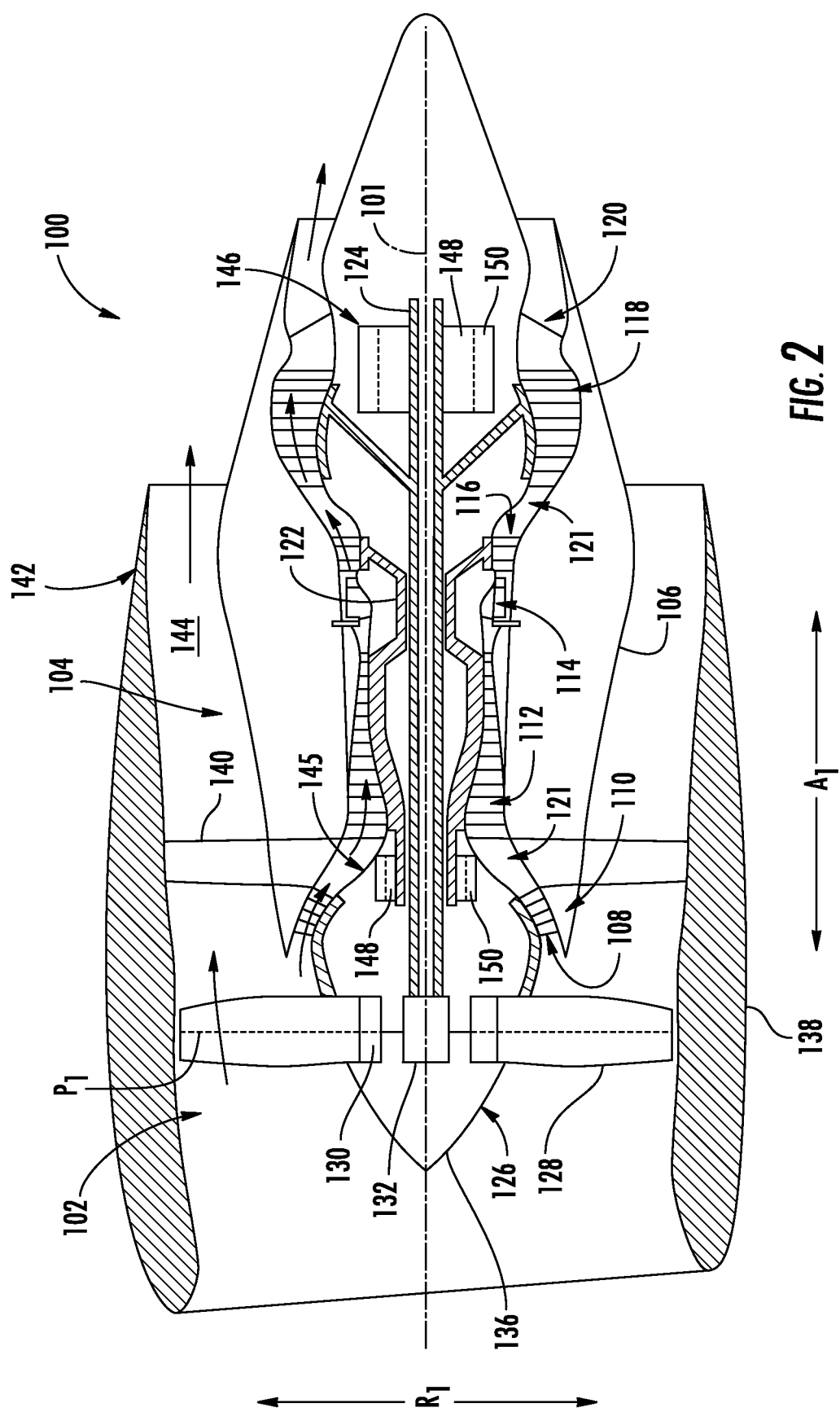
FIG. 2 is a schematic, cross-sectional view of a gas turbine engine mounted to the exemplary aircraft of FIG. 1.
Figure 3:
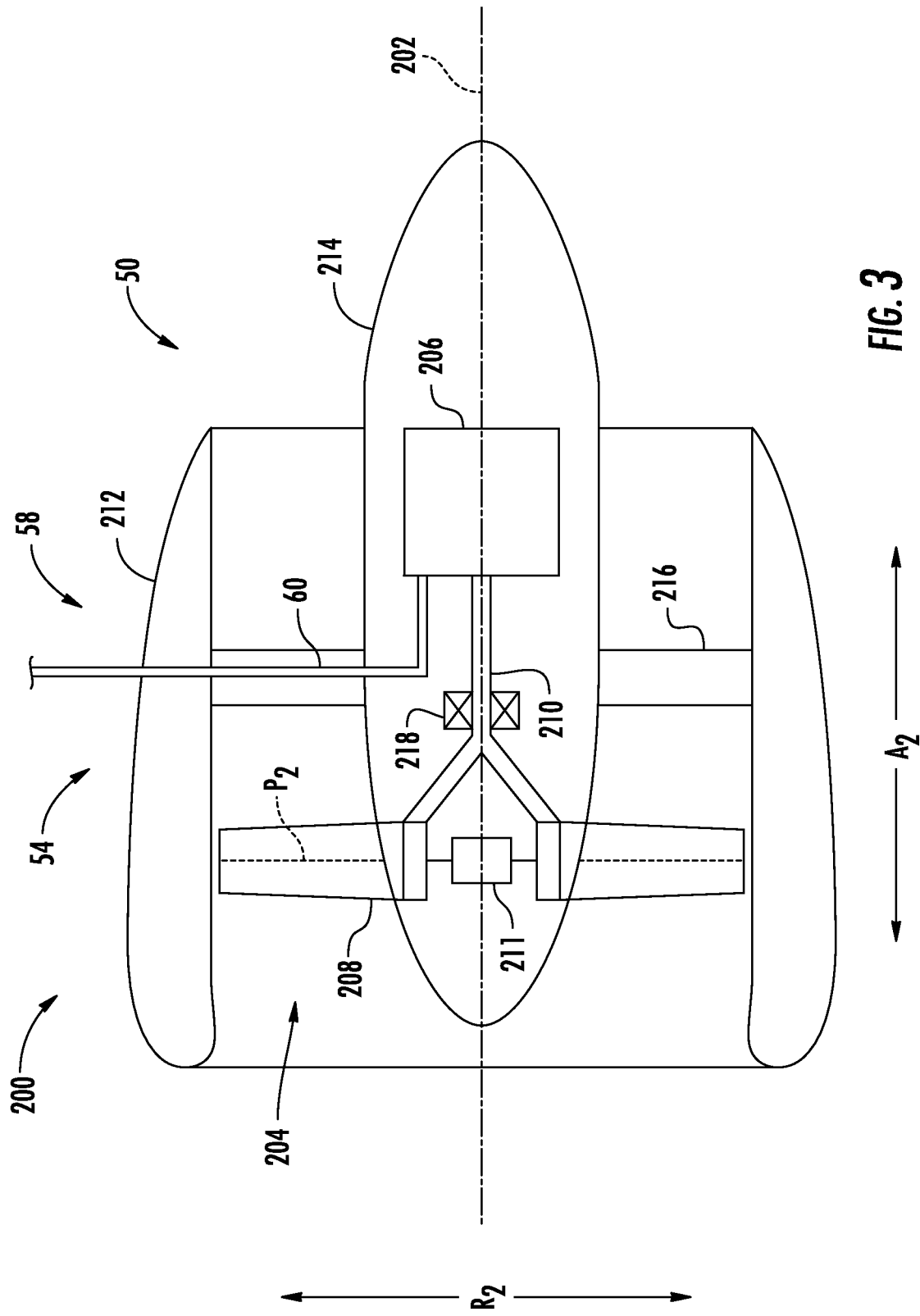
FIG. 3 is a schematic, cross-sectional view of an electric fan assembly in accordance with an exemplary embodiment of the present disclosure.

Referring now also to FIGS. 2 and 3, the exemplary aircraft 10 of FIG. 1 additionally includes a propulsion system 50 having a first propulsor assembly 52 and a second propulsor assembly 54. FIG. 2 provides a schematic, cross-sectional view of the first propulsor assembly 52, and FIG. 3 provides a schematic, cross-sectional view of the second propulsor assembly 54. As is depicted, each of the first propulsor assembly 52 and second propulsor assembly 54 are configured as under-wing mounted propulsor assemblies.

Referring particularly to FIGS. 1 and 2, the first propulsor assembly 52 is mounted, or configured to be mounted, to the first side 24 of the aircraft 10, or more particularly, to the first wing 20 of the aircraft 10. The first propulsor assembly 52 generally includes a turbomachine and a primary fan. More specifically, for the embodiment depicted the first propulsor assembly 52 is configured as a turbofan engine 100 (the turbomachine and the primary fan are configured as part of the turbofan engine 100).

As shown in FIG. 2, the turbofan engine 100 defines an axial direction A1 (extending parallel to a longitudinal centerline 101 provided for reference), a radial direction R1, and a circumferential direction C (extending about the axial direction A1; not depicted in FIG. 2). In general, the turbofan engine 100 includes a fan section 102 and a core turbine engine 104 disposed downstream from the fan section 102.

The exemplary core turbine engine 104 depicted generally includes a substantially tubular outer casing 106 that defines an annular inlet 108. The outer casing 106 encases, in serial flow relationship, a compressor section including a booster or low pressure (LP) compressor 110 and a high pressure (HP) compressor 112; a combustion section 114; a turbine section including a high pressure (HP) turbine 116 and a low pressure (LP) turbine 118; and a jet exhaust nozzle section 120. The compressor section, combustion section 114, and turbine section together define a core air flowpath 121 extending from the annular inlet 108 through the LP compressor 110, HP compressor 112, combustion section 114, HP turbine section 116, LP turbine section 118 and jet nozzle exhaust section 120. A high pressure (HP) shaft or spool 122 drivingly connects the HP turbine 116 to the HP compressor 112. A low pressure (LP) shaft or spool 124 drivingly connects the LP turbine 118 to the LP compressor 110.

For the embodiment depicted, the fan section 102 may include a fixed or variable pitch fan 126 having a plurality of fan blades 128 coupled to a disk 130 in a spaced apart manner. As depicted, the fan blades 128 extend outwardly from disk 130 generally along the radial direction R. For the variable pitch fan embodiment, each fan blade 128 is rotatable relative to the disk 130 about a pitch axis P1 by virtue of the fan blades 128 being operatively coupled to a suitable actuation member 132 configured to collectively vary the pitch of the fan blades 128 in unison. The fan blades 128, disk 130, and actuation member 132 are together rotatable about the longitudinal axis 14 by LP shaft 124.

Referring still to the exemplary embodiment of FIG. 2, the disk 130 is covered by rotatable front hub 136 aerodynamically contoured to promote an airflow through the plurality of fan blades 128. Additionally, the exemplary fan section 102 includes an annular fan casing or outer nacelle 138 that circumferentially surrounds the fan 126 and/or at least a portion of the core turbine engine 104. The nacelle 138 is supported relative to the core turbine engine 104 by a plurality of circumferentially-spaced outlet guide vanes 140. A downstream section 142 of the nacelle 138 extends over an outer portion of the core turbine engine 104 so as to define a bypass airflow passage 144 therebetween.

Additionally, the exemplary turbofan engine 100 depicted includes a first electric machine and a second electric machine. For the embodiment shown, the first electric machine is rotatable with the LP shaft 124 and fan 126, and the second electric machine is rotatable with the HP shaft 122. In such a manner, it will be appreciated that for the embodiment shown, the first electric machine is an LP electric machine 146 and the second electric machine is an HP electric machine 145.

Specifically, for the embodiment depicted, the LP electric machine 146 is configured as an electric generator co-axially mounted to and rotatable with the LP shaft 124. As used herein, "co-axially" refers to the axes being aligned. Moreover, for the embodiment shown, the LP electric machine 146 is positioned inward of the core air flowpath 121 within or aft of the turbine section of the turbofan engine 100, and as such may be referred to as an embedded electric machine.

Similarly, for the embodiment depicted, the HP electric machine 145 is configured as an electric generator co-axially mounted to and rotatable with the HP shaft 122. The HP electric machine 145 is also positioned inward of the core air flowpath 121, but within compressor section of the turbofan engine 100, and as such may also be referred to as an embedded electric machine.

The LP electric machine 146 and the HP electric machine 145 each include a rotor 148 and a stator 150. The LP electric machine 146 and the HP electric machine 145 may be configured in accordance with one or more of the exemplary electric machines described below.

It should be appreciated, however, that in other embodiments, an axis of the LP electric machine 146 and/or the HP electric machine 145 may be offset radially from the axes of the LP shaft 124 and HP shaft 122, respectively, and further the LP electric machine 146 and/or the HP electric machine 145 may be oblique to the axes of the LP shaft 124 and HP shaft 122, respectively. Further, in one or more exemplary embodiments, the LP electric machine 146 and/or the HP electric machine 145 may be located outward of the core air flowpath 121, e.g., within the casing 106 of the turbofan engine 100 or nacelle 138. Moreover, although the LP electric machine 146 and the HP electric machine 145 are described above as electric generators, in certain exemplary embodiments one or both of the LP electric machine 146 and the HP electric machine 145 may be configured as an electric motor, or may be switched between an electric generator mode and an electric motor mode.

Further, it should also be appreciated that the exemplary turbofan engine 100 depicted in FIG. 2 is provided by way of example only, and that in other exemplary embodiments, the turbofan engine 100 may have any other suitable configuration. For example, in other exemplary embodiments, the turbofan engine 100 may be configured as a turboprop engine, a turbojet engine, a differently configured turbofan engine, an unducted turbofan engine (e.g., without the nacelle 138, but including the stationary outlet guide vanes 140), or any other suitable gas turbine engine. For example, the gas turbine engine may be a geared gas turbine engine (e.g., having a reduction gearbox between the LP shaft 124 and fan 128), may have any other suitable number or configuration of shafts/spools (e.g., may include an intermediate speed shaft/turbine/compressor), etc.

Referring still to FIGS. 1 and 2, although not depicted in FIG. 2, the propulsion system 50 depicted additionally includes an electrical power connection assembly 58 to allow the LP and HP electric machines 146, 145 to be in electrical communication with one or more other components of the propulsion system 50 and/or the aircraft 10. For the embodiment depicted, the electrical power connection assembly 58 includes one or more electrical cables or lines 60 connected to the LP and HP electric machines 146, 145, which may extend from the LP and HP electric machines 146, 145 through one or more of the outlet guide vanes 140. As will be discussed in greater detail below, the electrical power bus is generally configured as a high-voltage electrical power bus, such that the propulsion system 50 may generally operate with relatively high voltages.

Additionally, the propulsion system 50 depicted further includes one or more energy storage devices 55 (such as one or more batteries or other electrical energy storage devices) electrically connected to the electrical power connection assembly 58 for, e.g., providing electrical power to the second propulsor assembly 54 and/or receiving electrical power from an electric generator. Inclusion of the one or more energy storage devices 55 may provide performance gains, and may increase a propulsion capability of the propulsion system 50 during, e.g., transient operations. More specifically, the propulsion system 50 including one or more energy storage devices 55 may be capable of responding more rapidly to speed change demands.

Referring now particularly to FIGS. 1 and 3, the exemplary propulsion system 50 additionally includes the second propulsor assembly 54 positioned, or configured to be positioned, at a location spaced apart from the first propulsor assembly 52.

Referring still to the exemplary embodiment of FIGS. 1 and 3, the second propulsor assembly 54 is mounted to the second side 26 of the aircraft 10, or rather to the second wing 22 of the aircraft 10. Referring particularly to FIG. 3, the second propulsor assembly 54 is generally configured as an electric propulsion assembly including an electric motor and a propulsor. More particularly, for the embodiment depicted, the electric propulsion assembly 200 includes an electric motor 206 and a propulsor/fan 204. The electric propulsion assembly 200 defines an axial direction A2 extending along a longitudinal centerline axis 202 that extends therethrough for reference, as well as a radial direction R2. For the embodiment depicted, the fan 204 is rotatable about the centerline axis 202 by the electric motor 206.

The fan 204 includes a plurality of fan blades 208 and a fan shaft 210. The plurality of fan blades 208 are attached to/rotatable with the fan shaft 210 and spaced generally along a circumferential direction of the fan (not shown). In certain exemplary embodiments, the plurality of fan blades 208 may be attached in a fixed manner to the fan shaft 210, or alternatively, the plurality of fan blades 208 may be rotatable relative to the fan shaft 210, such as in the embodiment depicted. For example, the plurality of fan blades 208 each define a respective pitch axis P2, and for the embodiment depicted are attached to the fan shaft 210 such that a pitch of each of the plurality of fan blades 208 may be changed, e.g., in unison, by a pitch change mechanism 211. Changing the pitch of the plurality of fan blades 208 may increase an efficiency of the second propulsor assembly 54 and/or may allow the second propulsor assembly 54 to achieve a desired thrust profile. With such an exemplary embodiment, the fan 204 may be referred to as a variable pitch fan.

Moreover, for the embodiment depicted, the electric propulsion assembly 200 depicted additionally includes a fan casing or outer nacelle 212, attached to a core 214 of the fan 204 through one or more struts or outlet guide vanes 216. For the embodiment depicted, the outer nacelle 212 substantially completely surrounds the fan 204, and particularly the plurality of fan blades 208. Accordingly, for the embodiment depicted, the fan 204 may be referred to as a ducted electric fan.

Referring still particularly to FIG. 3, the fan shaft 210 is mechanically coupled to the electric motor 206 within the core 214, such that the electric motor 206 drives the fan 204 through the fan shaft 210. The fan shaft 210 is supported by one or more bearings 218, such as one or more roller bearings, ball bearings, or any other suitable bearings. Additionally, the electric motor 206 may be an inrunner electric motor (i.e., including a rotor positioned radially inward of a stator), or alternatively may be an outrunner electric motor (i.e., including a stator positioned radially inward of a rotor).

As briefly noted above, the electric power source (i.e., the electric generator(s) of the first propulsor assembly 52 for the embodiment depicted) is electrically connected with the electric propulsion assembly (i.e., the electric motor 206 and the fan 204 of the electric propulsion assembly 200 for the embodiment depicted) for providing electrical power to the electric propulsion assembly. More particularly, the electric motor 206 of the electric propulsion assembly 200 is in electrical communication with the electric power system through the electrical power connection assembly 58, and more particularly through the one or more electrical cables or lines 60 extending therebetween. Again, as will be discussed in more detail below, the electrical power connection assembly 58 is configured to provide relatively high-voltage electrical power to the electric propulsion assembly for driving the electric propulsion assembly.

A propulsion system in accordance with one or more of the above embodiments may be referred to as a gas-electric, or hybrid-electric propulsion system, given that a first propulsor assembly is configured as a gas turbine engine and a second propulsor assembly is configured as an electrically driven fan.

It should be appreciated, however, that in other exemplary embodiments the exemplary propulsion system may have any other suitable configuration, and further, may be integrated into an aircraft 10 in any other suitable manner. For example, in other exemplary embodiments, the hybrid-electric propulsion system may have any suitable number of gas turbine engines (such as one, two, three, four, etc.) distributed in any suitable manner (such as along a port side wing, a starboard side wing, a fuselage of the aircraft, an aft location, etc.), and mounted in any suitable manner (such as in an under-wing mount, an over-wing mount, integrated into a wing, mounted to a fuselage of the aircraft, mounted to a stabilizer of the engine, mounted at the aft end as a boundary layer ingestion engine, etc.). Similarly, the hybrid-electric propulsion system may have any suitable number of electric propulsion engines (such as one, two, three, four, etc.) distributed in any suitable manner (such as along a port side wing, a starboard side wing, a fuselage of the aircraft, an aft location, etc.), and mounted in any suitable manner (such as in an under-wing mount, an over-wing mount, integrated into a wing, mounted to a fuselage of the aircraft, mounted to a stabilizer of the engine, mounted at the aft end as a boundary layer ingestion engine, etc.). In the event a plurality of gas turbine engines are provided with electric machine to generate electrical power, each may be directed to a single electric propulsion engine or a single group of electric propulsion engines, or each may be in electrical communication with a common electrical bus to provide power to the electric propulsion engine(s).

Moreover, it will be appreciated that although the propulsion system described herein is depicted as having been incorporated into an aircraft 10, in other exemplary embodiments, the propulsion system may additionally or alternatively be incorporated into any other suitable vehicle. For example, in other exemplary embodiments, the propulsion system may be incorporated into a nautical vehicle utilizing one or more turbine engines (such as a ship or submarine), a locomotive vehicle utilizing one or more turbine engines, etc.

Figure 4:
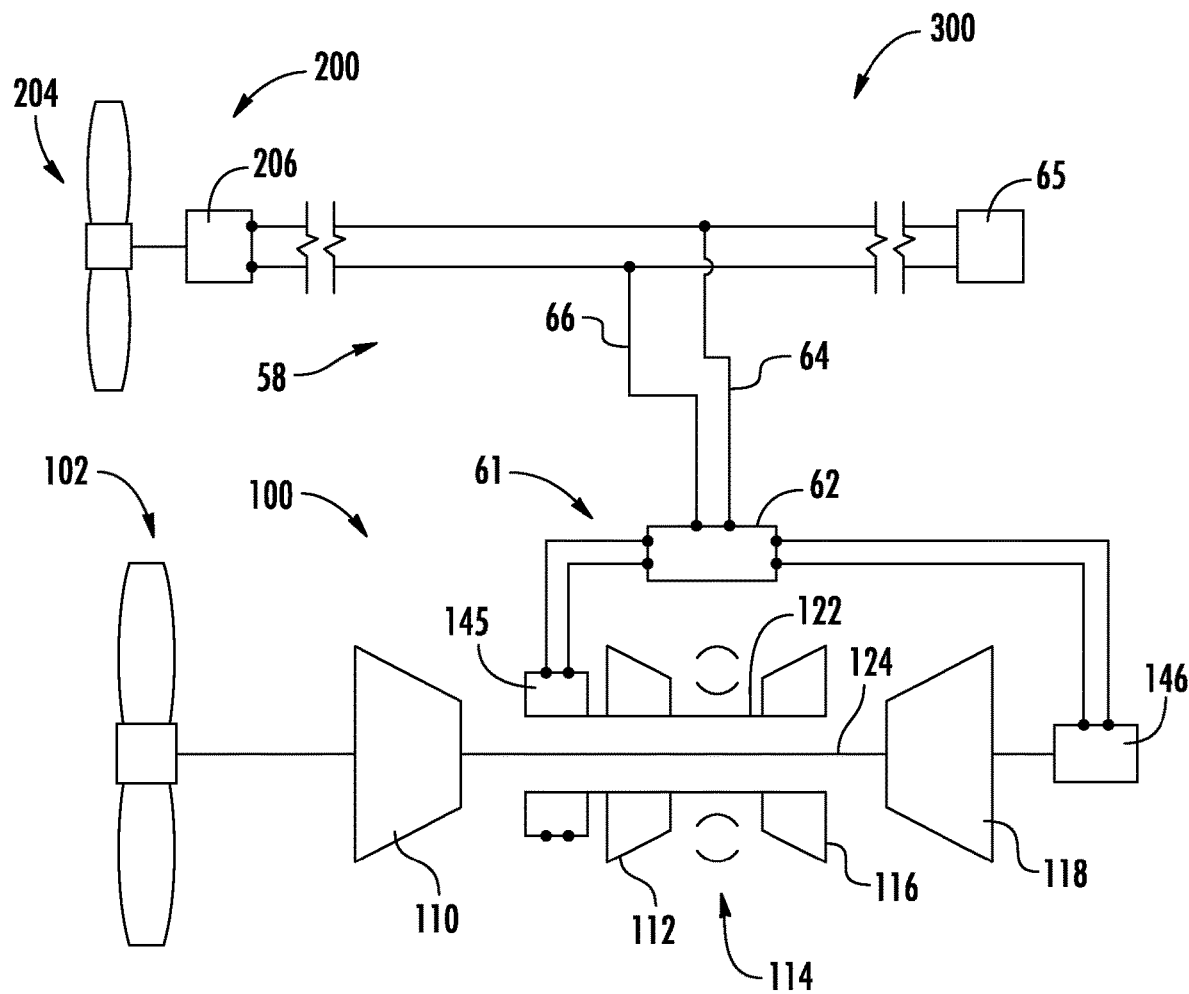
FIG. 4 is a schematic view of a propulsion system including an electric power system in accordance with another exemplary embodiment of the present disclosure.

Referring now briefly to FIG. 4, a schematic view is provided for a hybrid electric propulsion system in accordance with the present disclosure. The exemplary hybrid electric propulsion system may incorporate aspects of the systems described above with reference to FIGS. 1 through 3. For example, the exemplary hybrid electric propulsion system 300 can include a gas turbine engine 100 having an HP electric machine 145 rotatable with an HP shaft 122 of the gas turbine engine 100 and an LP electric machine 146 rotatable with an LP shaft 124 of the gas turbine engine 100. The HP electric machine 145 and LP electric machine 146 can be part of an electric power system 61 that also includes a power distribution unit (PDU) 62. PDU 62 can provide multiple DC voltages that are generated by the electric power system 61. Such multiple DC voltages can be provided at the same and/or different values, provided at fixed and/or varied levels, and configured as either regulated and/or unregulated voltages. In some implementations, such as when the LP electric machine 146 is a generator and the HP electric machine is a starter-generator, power generated by the electric power system 61 can include electric power that flows between LP and HP spools (e.g., from the LP generator to the HP starter-generator) for the purpose of improving specific fuel consumption.

The exemplary hybrid electric propulsion system 300 further includes an electric propulsion assembly 200 having a fan/propulsor 204 and an electric motor 206. The exemplary hybrid electric propulsion system 300 also includes an electrical power connection assembly 58 electrically coupling the gas turbine engine (or rather the HP and LP electric machines 145, 146) with the electric propulsion assembly 200 (or rather the electric motor 206).

The system depicted in FIG. 4 can additionally include an aircraft load 65 that is coupled to the PDU 62 and that is powered by the multiple DC channels. In some implementations, aircraft load 65 can correspond to one or more engine electrical loads such as but not limited to fuel pump(s), cooling pump(s) and engine icing protection. In some implementations, aircraft load 65 can correspond to one or more environmental control systems such as but not limited to systems for cabin pressurization, cabin air-conditioning, and the like, flight control electrified actuators, avionics, wing icing protection, and other systems requiring DC power within an aircraft.

Notably, the electrical power connection assembly 58 is configured as a dual bus system whereby PDU 62 includes first and second independent electrical power buses. The first electrical power bus can electrically connect and provide a first source of DC power from the electric power system 61 to the electric propulsion assembly 200 and/or to aircraft load 65. For instance, a first set of one or more cables or connectors 64 can be provided to transfer power from the first electrical power bus of PDU 62 to the electric propulsion assembly 200 (or rather the electric motor 206), and/or to aircraft load 65. The second electrical power bus can electrically connect and provide a second source of DC power from the electric power system 61 to the electric propulsion assembly 200 and/or to aircraft load 65. For instance, a second set of one or more cables or connectors 66 can be provided to transfer power from the second electrical power bus of PDU 62 to the electric propulsion assembly 200 (or rather the electric motor 206) and/or to aircraft load 65. The second electrical power bus of PDU 62 is configured to be electrically independent from the first electrical power bus. Although only first and second sets of cables/connectors 64, 66 are illustrated in FIG. 4 and discussed with reference to first and second electrical power buses of PDU 62, it should be appreciated that additional layers of redundancy (e.g., a plurality of electrical power buses including first, second, third, or more power buses) are possible.

Referring still to FIG. 4, electric power system 61 can be configured as a high-voltage electric power system, and propulsion system 300 can be configured as a high-voltage propulsion system. As such, the power generated by HP electric machine 145 and LP electric machine 146 and ultimately transferred by PDU 62 to the electric propulsion assembly 200 and/or to aircraft load 65 can be configured to provide electrical power at a voltage exceeding 800 volts ("V"). For example, in certain exemplary embodiments, the electric power buses within PDU 62 can be configured to transfer electrical power received from HP electric machine 145 and LP electric machine 146 to the electric propulsion assembly 200 and/or to aircraft load 65 at a bipolar voltage level between about +/−270 V and about +/−2400 V, or more particularly between about +/−270 V and about +/−1,200 V. In other embodiments, the electric power buses within PDU 62 can be configured to transfer electrical power received from HP electric machine 145 and LP electric machine 146 to the electric propulsion assembly 200 and/or to aircraft load 65 at a bipolar or unipolar voltage level between 270 and 800, below 270, between 600 and 1200, about 800, about 1200, between 800 and 1600, between 1200 and 2400, about 1600, about 2600, about 3000, between 2400 and 3000, about 4800, between 3000 and 4800, and/or above 4800. By transferring electrical power from the electric power system 61 to the electric propulsion assembly 200 and/or the aircraft load 65 (via the first and second independent power buses) at relatively high voltages, electrical power can be transferred at a lower electrical current while still delivering a desired amount of power. Such a configuration may allow for cables (e.g., cables 64, 66) having a reduced thickness, or diameter, which may save weight in an aircraft including the exemplary propulsion system 300. Because transfer cables can often be required to extend relatively long distances, a reduced thickness, or diameter, within such cables can advantageously save an appreciable amount of size and weight within the aircraft.

For example, in certain exemplary embodiments, PDU 62 may be configured to transfer electrical power to the electric propulsion assembly 200 and/or aircraft load at an electrical current between about 30 amps ("A") and about 1,200 A, such as between about 100 A and about 1,000 A. With such an exemplary embodiment, the PDU 62 may be configured to transfer at least about 750 kilowatts of electrical power to the electric propulsion assembly 200 and up to about twelve (12) megawatts of electrical power. For example, in certain exemplary embodiments the PDU 62 may be configured to transfer at least about one (1) megawatt of electrical power to the electric propulsion assembly 200 and/or aircraft load 65, such as between about one (1) megawatt of electrical power and about two (2) megawatts of electrical power.

FIGS. 5-16 generally provide additional details of the dual bus system within PDU 62 and other aspects of an electric power system 61 that includes a plurality of electric machines (e.g., HP electric machine 145 and LP electric machine 146). The dual bus system is designed to add a level of redundancy to the electric power system 61. To that effect, if a fault occurs within various locations (e.g., in an electric machine connection, internal to an electric machine, in electrical cables, in a power converter, etc.), one of the electrical power buses can be taken offline while the other electrical power bus(es) continue to operate.

Figure 5:
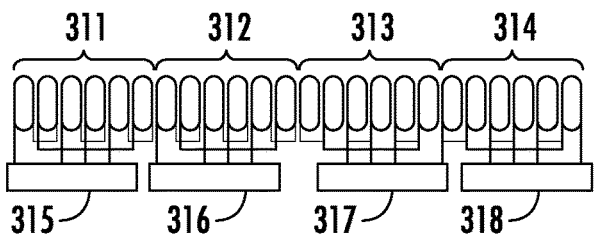
FIG. 5 depicts a first example electric machine connection configuration in accordance with an exemplary embodiment of the present disclosure.
Figure 6:
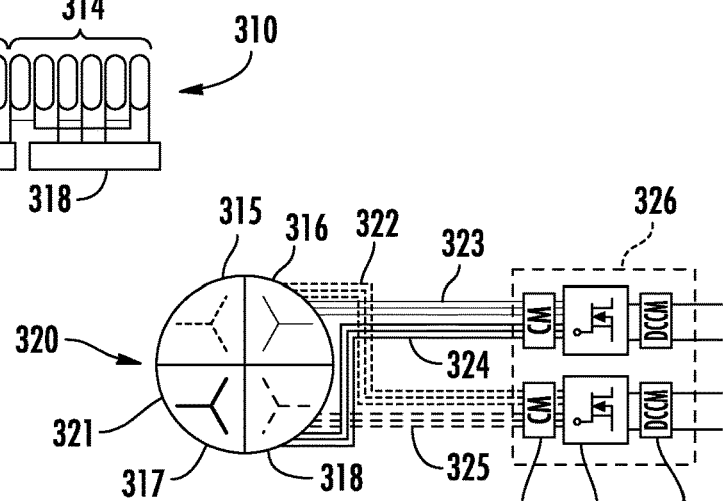
FIG. 6 is a schematic representation of a first generator and converter assembly using the first example electric machine connection configuration of FIG. 5 in accordance with an exemplary embodiment of the present disclosure.
Figure 7:
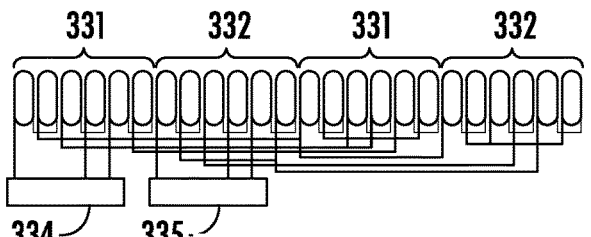
FIG. 7 depicts a second example electric machine connection configuration in accordance with an exemplary embodiment of the present disclosure.
Figure 8:
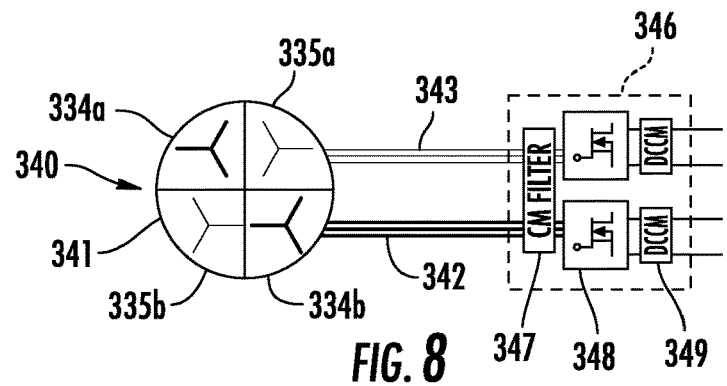
FIG. 8 is a schematic representation of a second generator and converter assembly using the second example electric machine connection configuration of FIG. 7 in accordance with an exemplary embodiment of the present disclosure.
Figure 9:
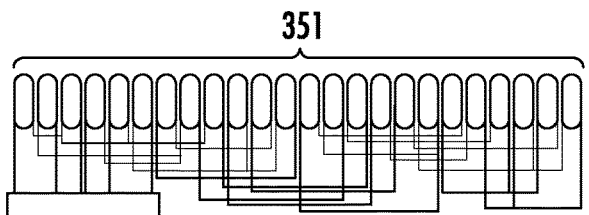
FIG. 9 depicts a third example electric machine connection configuration in accordance with an exemplary embodiment of the present disclosure.
Figure 10:
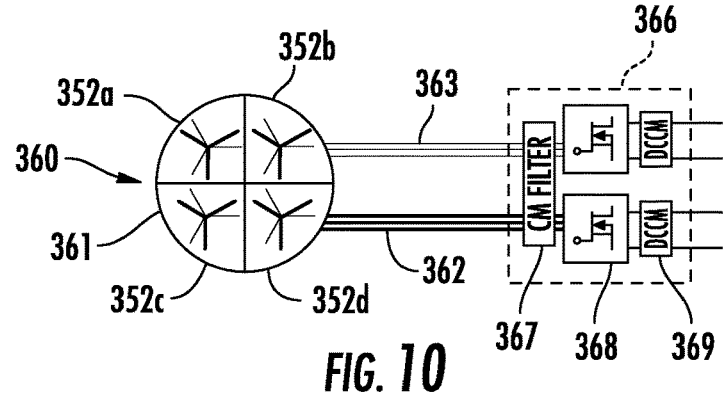
FIG. 10 is a schematic representation of a third generator and converter assembly using the third example electric machine connection configuration of FIG. 9 in accordance with an exemplary embodiment of the present disclosure.

Referring now to FIGS. 5-10, additional aspects of electric machine connections within an electric power system 61 are schematically illustrated. FIGS. 5, 7, and 9 depict example connection configurations for windings and terminals within an electric machine, while FIGS. 6, 8, and 10 provide corresponding schematic illustrations of how the connection configurations of FIGS. 5, 7, and 9 can be coupled to subsequent components within an electric power system. It should be appreciated that the connection configurations and corresponding schematics of FIGS. 5-10 illustrate only a single electric machine. However, the configurations can be equally applied across multiple electric machines (e.g., a first electric machine such as LP electric machine (LP generator) 146 and a second electric machine such as HP electric machine (HP generator 145). When multiple electric machines are included within an electric power system embodiment, the machines can include the same or different configurations, and can be designed to deliver the same or different voltage/power levels across multiple DC channels. In some instances, a given electric machine can include windings designed for carrying different currents within the same electric machine. In addition, the winding configurations of FIGS. 5, 7, and 9 depict a particular number of winding sections. It should be appreciated that each configuration with a plurality of windings can be modified to include a different number of windings. For example, a configuration with four (4) windings can be modified to include a greater number of windings and still be within the spirit and scope of the disclosed technology.

FIG. 5 is a schematic representation of a first example electric machine connection configuration 310 in accordance with an exemplary embodiment of the present disclosure. Electric machine connection configuration 310 can be implemented as part of an electric machine. In some examples, electric machine connection configuration 310 can be implemented as part of a first electric machine (e.g., LP electric machine 146) and/or as part of a second electric machine (e.g., HP electric machine 145).

In accordance with electric machine connection configuration 310, an electric machine can include first, second, third, and fourth winding sections 311-314. Such plurality of winding sections 311-314 can be multi-phase and/or substantially magnetically decoupled. The winding sections 311-314 can be provided in a configuration such that an electric machine including electric machine connection configuration 310 is mechanically balanced even if one of the plurality of windings is de-energized. In some implementations, the plurality of windings can be tooth-wound and/or spatially distributed. However, it should be appreciated that other coil winding configurations can be employed. For instance, distributed winding configurations and/or concentrated winding configurations can be additionally or alternatively utilized. In addition, the winding configurations can be designed such that magnetic flux travels in different manners throughout the electric machine(s), for instance yielding a radial-flux machine and/or an axial-flux machine.

Accordingly, it will be appreciated that as used herein, the term "substantially magnetically decoupled" with respect to a plurality of winding sections refers to a nominal level of magnetic coupling between and among various winding sections. More particularly, although it may be difficult to ensure complete magnetic decoupling among winding sections, winding sections that are "substantially magnetically decoupled" can correspond to winding sections in which an amount of magnetic coupling is minimized, below a nominal threshold value, and/or as close to zero as possible. Magnetic decoupling can be generally achieved at least in part by the way in which winding sections are wound within an electric machine and/or by properly adjusting phase angle between sets of winding sections. Magnetic decoupling among a group of windings enables remaining windings in the group to continue to operate while at least one winding in the group is not functioning normally. One example would be when a winding has insulation failure, in which case the winding is desired to either be de-energized or operated in an insulation failure mitigation scheme.

In addition, it will be appreciated that the term "mechanically balanced" as used herein refers to the active balancing of a plurality of windings in an electric machine. The plurality of windings can be individually excited (e.g., magnetized and loaded) in a way that the combined mechanical forces normal to the airgap of the electric machine produced by the plurality of windings are well balanced. Even if at least one of the plurality of windings is de-energized or is in limited operation, the excitation of the remaining plurality of windings can be adjusted to maintain the mechanical balance or to reduce the unbalance to a manageable level. For example, a group of windings (e.g., the pair of windings 311 and 313 in the embodiment depicted in FIG. 5) can be configured for operation in a manner that balances each other while another group of windings (e.g., the pair of windings 312 and 314) can also be configured for operation in a manner that balances each other. Still further, it will be appreciated that the term "multi-phase" as used herein shall cover various configurations in which more than one phase of electrical power is supplied.

Referring still to FIG. 5, the first winding section 311, second winding section 312, third winding section 313, and fourth winding section 314 can each spatially span about one-quarter of the length of its associated electric machine. Each winding section 311-314 includes three terminals for three-phase (3 ph) electric power. Three-phase power terminals associated with the first winding section 311 can collectively form a first wye-configuration, or star-configuration, connection 315. Three-phase power terminals associated with the second winding section 312 can collectively form a second wye-configuration, or star-configuration, connection 316. Three-phase power terminals associated with the third winding section 313 can collectively form a third wye-configuration, or star-configuration, connection 317. Three-phase power terminals associated with the fourth winding section 314 can collectively form a fourth wye-configuration, or star-configuration, connection 318. In some embodiments, AC power generated at the first and third connections 315, 317 can be diametrically shifted by 180 degrees from the AC power generated at the second and fourth connections 316, 318.

Although FIG. 5 and others depict or describe wye-configuration, or star-configuration, connections, it will be appreciated that other suitable connection configurations can be employed. By way of example, power terminals associated with the various winding sections can be configured using one or more of a delta connection, a parallel connection, a series connection, an open-ended connection, etc. In some instances, different connection configurations can be used. For example, at least one winding section in an electric machine can have a first connection configuration (e.g., wye-connected) and at least another winding section can have a second connection configuration (e.g., delta-connected) that is different than the first connection configuration.

FIG. 6 is a schematic representation of a first generator and converter assembly 320 using the first example electric machine connection configuration 310 of FIG. 5. More particularly, electric machine 321 can include the first star-configuration connection 315, second star-configuration connection 316, third star-configuration connection 317, and fourth star-configuration connection 318 depicted in FIG. 5. A first set of AC cables 322 electrically couples the first connection 315 of electric machine (generator) 321 to a converter 326. A second set of AC cables 323 electrically couples the second connection 316 of electric machine (generator) 321 to converter 326. A third set of AC cables 324 electrically couples the third connection 317 of electric machine (generator) 321 to converter 326. A fourth set of AC cables 325 electrically couples the fourth connection 318 of electric machine (generator) 321 to converter 326. In some examples, converter 326 can be an active power rectifier assembly including, for example, one or more common mode filters 327, one or more AC/DC converter circuit elements 328, and one or more DC common mode (DCCM) filters 329. In other examples, converter 326 can be a passive power rectifier assembly including, for example, a plurality of diode rectifiers and AC capacitors provided at terminals of the electric machine 321. In some embodiments, a first set of terminals within the electric machine 321 can be coupled to an active power rectifier, while a second set of terminals within the electric machine 321 can be coupled to a passive power rectifier.

FIG. 7 is a schematic representation of a second example electric machine connection configuration 330 in accordance with an exemplary embodiment of the present disclosure. Electric machine connection configuration 330 can be implemented as part of an electric machine. In some examples, electric machine connection configuration 330 can be implemented as part of a first electric machine (e.g., LP electric machine 146) and/or as part of a second electric machine (e.g., HP electric machine 145).

In accordance with electric machine connection configuration 330, an electric machine can include a plurality of self-balancing windings, such as first and second winding sections 331, 332. Such plurality of winding sections 331-332 can be multi-phase and/or substantially magnetically decoupled. The winding sections 331-332 can be provided in a configuration such that an electric machine including electric machine connection configuration 320 is mechanically balanced even if one of the plurality of windings is de-energized. In some implementations, the plurality of windings can be tooth-wound and/or spatially distributed.

Each winding of the plurality of windings in FIG. 7 is arranged to mechanically balance on its own. For example, with a four (4) winding section arrangement, a diametrical pair of windings can be combined (e.g., in series or in parallel) to form a single multi-phase winding. As such, each of the first and second winding sections 331, 332 each correspond to a multi-phase winding formed by combining a diametrical pair of windings that is respectively combined. It should be appreciated that additional or alternative configurations can be achieved with a different number of winding sections than illustrated. For instance, if there are six (6) winding sections spaced by 60 degrees, a first group of three windings spaced 120 degrees apart can be combined into a first multi-phase winding, while a second group of three windings spaced 120 degrees apart can be combined into a second multi-phase winding. Additionally or alternatively, such a six-winding embodiment can be configured to include three (3) self-balancing windings, by connecting (e.g., in series or in parallel) each diametric pair spaced by 180 degrees into a single winding. In this arrangement, mechanical balance can be maintained, even though one winding is excited (magnetized and loaded) differently from another winding.

Referring still to FIG. 7, each winding section 331, 332 includes three terminals for three-phase (3 ph) electric power. Three-phase power terminals associated with the first winding section 331 can collectively form a first wye-configuration, or star-configuration, connection 334. Three-phase power terminals associated with the second winding section 332 can collectively form a second wye-configuration, or star-configuration, connection 335.

FIG. 8 is a schematic representation of a second generator and converter assembly 340 using the second example electric machine connection configuration 330 of FIG. 7. More particularly, electric machine 341 can include two instances 334a, 334b of the first star-configuration connection 334 and two instances 335a, 335b of the second star-configuration connection 335 depicted in FIG. 7. A first set of AC cables 342 electrically couples the two instances 334a, 334b of the first connection 334 of electric machine (generator) 341 to a converter 346. A second set of AC cables 343 electrically couples the two instances 335a, 335b of the second connection 335 of electric machine (generator) 341 to converter 346. In some examples, converter 346 can be an active power rectifier assembly including, for example, one or more common mode filters 347, one or more AC/DC converter circuit elements 348, and one or more DC common mode (DCCM) filters 349. In some examples, converter 346 can be a passive power rectifier assembly including, for example, a plurality of diode rectifiers and AC capacitors provided at terminals of the electric machine 341. In some embodiments, a first set of terminals within the electric machine 341 can be coupled to an active power rectifier, while a second set of terminals within the electric machine 341 can be coupled to a passive power rectifier. Compared with the assembly 320 of FIG. 6, assembly 340 of FIG. 8 only requires half the number of AC cables, thus providing an increase in volumetric efficiency, and reduction in cost, size, and weight of the cables.

FIG. 9 is a schematic representation of a third example electric machine connection configuration 350 in accordance with an exemplary embodiment of the present disclosure. Electric machine connection configuration 350 can be implemented as part of an electric machine. In some examples, electric machine connection configuration 350 can be implemented as part of a first electric machine (e.g., LP electric machine 146) and/or as part of a second electric machine (e.g., HP electric machine 145).

In accordance with electric machine connection configuration 350, an electric machine can include a winding section 351. Winding section 351 can include a plurality of coupled winding pairs (e.g., four coupled winding pairs). Such plurality of windings (e.g., the plurality of coupled winding pairs in winding section 351) can be multi-phase and/or substantially magnetically decoupled. The windings can be provided in a configuration such that an electric machine including electric machine connection configuration 350 is mechanically balanced even if one of the plurality of windings is de-energized. In some implementations, the plurality of windings can be tooth-wound and/or spatially distributed.

Referring still to FIG. 9, winding section 351 can spatially span the full length of its associated electric machine, and can include six terminals for six-phase (6 ph) electric power. Six-phase power terminals associated with the winding section 351 can collectively form a double-wye-configuration, or double-star-configuration, connection 352. In some examples, the six-phase power terminals associated with the winding section 351 are configured such that each of first and second phase power terminals, third and fourth phase power terminals, and fifth and sixth phase power terminals are shifted from one another by thirty (30) degrees, while first, third and fifth power terminals are shifted from one another by 120 degrees, and second, fourth, and sixth power terminals are shifted from one another by 120 degrees. The six-phase power configuration of FIG. 9 can help lower harmonics to advantageously reduce the possibility of torque ripple within an electric machine while also achieving a better power quality.

FIG. 10 is a schematic representation of a third generator and converter assembly 360 using the third example electric machine connection configuration 350 of FIG. 9. More particularly, electric machine 361 can include four instances 352a, 352b, 352c, 352d of the double-star-configuration connection 352 depicted in FIG. 9. A first set of AC cables 362 electrically couples the four instances 352a, 352b, 352c, 352d of connection 352 of electric machine (generator) 361 to a converter 366. A second set of AC cables 363 electrically couples the four instances 352a, 352b, 352c, 352d of the connection 352 of electric machine (generator) 361 to converter 366. In some examples, converter 366 can be an active power rectifier assembly including, for example, one or more common mode filters 367, one or more AC/DC converter circuit elements 368, and one or more DC common mode (DCCM) filters 369. In some examples, converter 366 can be a passive power rectifier assembly including, for example, a plurality of diode rectifiers and AC capacitors provided at terminals of the electric machine 361. In some embodiments, a first set of terminals within the electric machine 361 can be coupled to an active power rectifier, while a second set of terminals within the electric machine 361 can be coupled to a passive power rectifier.

Referring now to FIGS. 11-14, additional system-level aspects of electric power systems in accordance with the disclosed technology are depicted. FIGS. 11-14 depict respective electric power systems such as might be implemented as part of the electric power system 61 depicted in FIG. 4. It should be appreciated that aspects from one power system in FIGS. 11-14 can be combined with aspects from other power systems in such figures to create additional embodiments than those specifically depicted.

Figure 11:
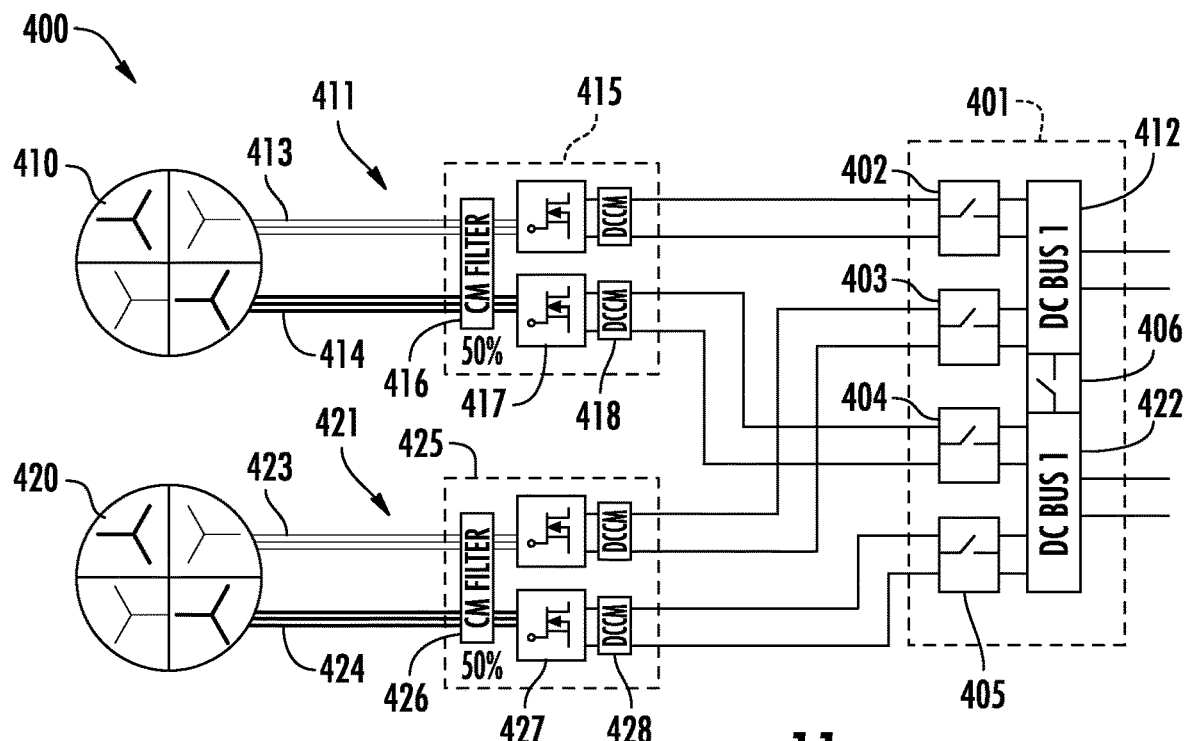
FIG. 11 is a first system-level representation of an electric power system in accordance with an exemplary embodiment of the present disclosure.

FIG. 11 depicts a first electric power system 400 in accordance with an exemplary embodiment of the present disclosure. Electric power system 400 can include at least one electric machine. As depicted, electric power system 400 includes a plurality of electric machines, which can include at least a first electric machine 410 and a second electric machine 420. In some embodiments, the first electric machine 410 is an LP electric machine or LP generator, such as LP electric machine 146, while the second electric machine 420 is an HP electric machine or HP generator, such as HP electric machine 145. First electric power system 400 also includes first and second electrical channels 411 and 421 that are electrically independent from one another.

First electrical channel 411 electrically couples the first electric machine 410 to a first electrical power bus 412 and to a second electrical power bus 422. First electrical channel 411 can also include a first converter 415 (e.g., an LP converter) positioned between the first electric machine 410 (e.g., an LP generator) and the first and second electrical power buses 412, 422. First electrical channel 411 can include a first plurality of AC cables 413 coupling respective first wye-connection instances of first electric machine 410 to a first converter 415 (e.g., an LP converter). First electrical channel 411 can also include a second plurality of AC cables 414 coupling respective second wye-connection instances of first electric machine 410 to the first converter 415 (e.g., LP converter). The multiple instances of wye-connections within the first electric machine 410 as coupled to the first plurality of AC cables 413 and to the second plurality of AC cables 414 provide first and second independent inverter channels that are magnetically balanced within first electrical channel 411. In some examples, first converter 415 can include one or more common mode filters 416, one or more AC/DC converter circuit elements 417, and one or more DC common mode (DCCM) filters 418.

Second electrical channel 421 electrically couples the second electric machine 420 to the first electrical power bus 412 and to the second electrical power bus 422. Second electrical channel 421 can also include a second converter 425 (e.g., an HP converter) positioned between the second electric machine 420 (e.g., an HP generator) and the first and second electrical power buses 412, 422. Second electrical channel 421 can include a first plurality of AC cables 423 coupling respective first wye-connection instances of second electric machine 420 to a second converter 425 (e.g., an HP converter). Second electrical channel 421 can also include a second plurality of AC cables 424 coupling respective second wye-connection instances of electric machine 420 to the second converter 425 (e.g., HP converter). The multiple instances of wye-connections within the second electric machine 420 as coupled to the first plurality of AC cables 423 and to the second plurality of AC cables 424 provide first and second independent inverter channels that are magnetically balanced within second electrical channel 421. In some examples, second converter 425 can include one or more common mode filters 426, one or more AC/DC converter circuit elements 427, and one or more DC common mode (DCCM) filters 428.

It will be appreciated from the description herein that although the various AC cables within the first and second electric machines are described as using a "wye-connection", in other exemplary embodiments one or more of such AC cables may alternatively use any other suitable connection configuration. By way of example, in certain exemplary embodiments, one or more of such AC cables may use one of a delta connection, a parallel connection, a series connection, an open ended connection, etc.

Electric power system 400 can also include a power distribution unit (PDU) 401. PDU 401 can include the first electrical power bus 412, the second electrical power bus 422, and various switches 402-406. A first switch 402 is positioned between DC cables from the first converter 415 and the first electrical power bus 412. A second switch 403 is positioned between DC cables from the second converter 425 and the first electrical power bus 412. A third switch 404 is positioned between DC cables from the first converter 415 and the second electrical power bus 422. A fourth switch positioned between DC cables from the second converter 425 and the second electrical power bus 422. Switch 406 (e.g., a disconnect switch) is positioned between and electrically couples the first electrical power bus 412 and the second electrical power bus 422. Switches 402-406 can be variously toggled between first and second positions depending on whether faults are detected within electric power system 400. For example, switch 406 can be configured for operation in a first position (e.g., an open position) during normal steady-state operation of the electric power system 400. Switch 406 can be configured for operation in a second position (e.g., a closed position) during fault operation of the electric power system 400. In this way, power can be provided to both electrical power busses 412 and 422 even in the case of failure of one of the electric machines 410, 420. Fault operation can correspond to operation of the electric power system during a timeframe in which a fault is detected. Faults that would affect operation of one of the electrical power buses 412, 422 could include but are not limited to faults in the connections to electric machines 410, 420, faults internal to an electric machine 410, 420, faults in electrical cables that are part of the first and second electric electrical channels 411, 421, faults in a power converter 415, 425, or the like.

Figure 12:
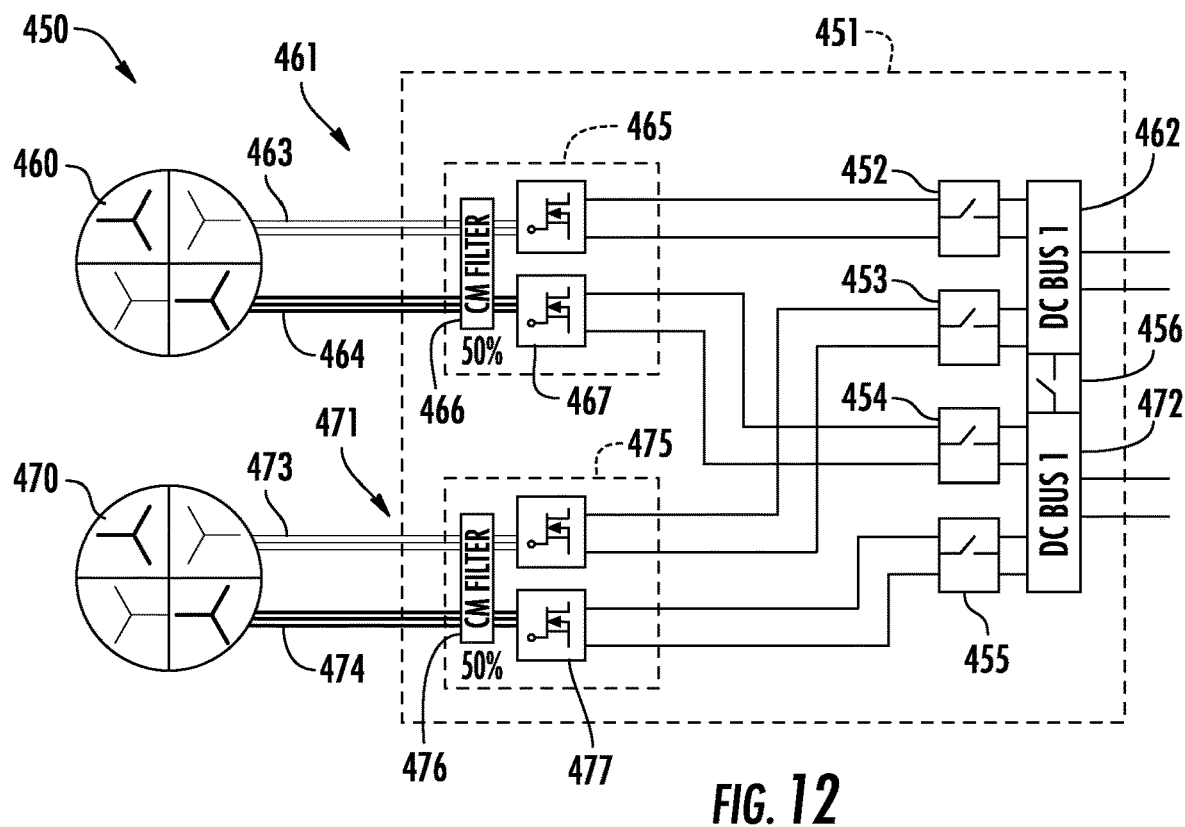
FIG. 12 is a second system-level representation of an electric power system in accordance with an exemplary embodiment of the present disclosure.

FIG. 12 depicts a second electric power system 450 in accordance with an exemplary embodiment of the present disclosure. Electric power system 450 includes a plurality of electric machines. The plurality of electric machines can include at least a first electric machine 460 and a second electric machine 470. In some embodiments, the first electric machine 460 is an LP electric machine or LP generator, such as LP electric machine 146, while the second electric machine 470 is an HP electric machine or HP generator, such as HP electric machine 145. Second electric power system 450 also includes first and second electrical channels 461 and 471 that are electrically independent from one another.

First electrical channel 461 electrically couples the first electric machine 460 to a first electrical power bus 462 and to a second electrical power bus 472. First electrical channel 461 can also include a first converter 465 (e.g., an LP converter) positioned between the first electric machine 460 (e.g., an LP generator) and the first and second electrical power buses 462, 472. First electrical channel 461 can include a first plurality of AC cables 463 coupling respective first wye-connection instances of first electric machine 460 to a first converter 465 (e.g., an LP converter). First electrical channel 461 can also include a second plurality of AC cables 464 coupling respective second wye-connection instances of first electric machine 460 to the first converter 465 (e.g., LP converter). The multiple instances of wye-connections within the first electric machine 460 as coupled to the first plurality of AC cables 463 and to the second plurality of AC cables 464 provide first and second independent inverter channels that are magnetically balanced within first electrical channel 461. In some examples, first converter 465 can include one or more common mode filters 466 and one or more AC/DC converter circuit elements 467.

Second electrical channel 471 electrically couples the second electric machine 470 to the first electrical power bus 462 and to the second electrical power bus 472. Second electrical channel 471 can also include a second converter 475 (e.g., an HP converter) positioned between the second electric machine 470 (e.g., an HP generator) and the first and second electrical power buses 462, 472. Second electrical channel 471 can include a first plurality of AC cables 473 coupling respective first wye-connection instances of second electric machine 470 to a second converter 475 (e.g., an HP converter). Second electrical channel 471 can also include a second plurality of AC cables 474 coupling respective second wye-connection instances of electric machine 470 to the second converter 475 (e.g., HP converter). The multiple instances of wye-connections within the second electric machine 470 as coupled to the first plurality of AC cables 473 and to the second plurality of AC cables 474 provide first and second independent inverter channels that are magnetically balanced within second electrical channel 471.

In some examples, second converter 475 can include one or more common mode filters 476 and one or more AC/DC converter circuit elements 477.

Electric power system 450 can also include a power distribution unit (PDU) 451. PDU 451 can include the first converter 465, second converter 475, first electrical power bus 462, second electrical power bus 472, and various switches 452-456. Notably, the first converter 465 (e.g., an LP converter), the second converter 475 (e.g., an HP converter), the first electrical power bus 462, and the second electrical power bus 472 are all co-located within PDU 451. For example, the first converter 465 (e.g., an LP converter), the second converter 475 (e.g., an HP converter), the first electrical power bus 462, and second electrical power bus 472 can all be mechanically positioned within a same structural housing defining PDU 451.

Comparing second electric power system 450 of FIG. 12 to the first electric power system 400 of FIG. 11, co-location of some components within PDU 451 enables elimination or reduction of other components. Component reduction can advantageously reduce size and weight of the power system, which can be especially desirable for aircraft applications. For instance, DC cables in first electric power system 400 of FIG. 11 connecting the first converter 415 to the first and second electrical power buses 412, 422 and connecting the second converter 425 to the first and second electrical power buses 412, 422 can be removed in the second electric power system 450 of FIG. 12. Instead, busbars can be used to connect first converter 465 to first and second electrical power buses 462, 472 and to connect second converter 475 to first and second electrical power buses 462, 472. DCCM filters 418, 428 in the first and second converters 415, 425 of first electric power system 400 can also be removed in the second electric power system 450 of FIG. 12. Elimination and/or reduction of the DC cables and DCCM filters can also advantageously reduce DC capacitance within the second electric power system 450, provide a common thermal interface within PDU 451, and increase overall volumetric power density within second electric power system 450.

Referring still to FIG. 12, a first switch 452 can be positioned at a location on the busbars associated with the first electrical power bus 462 that is coupled to the first converter 465, a second switch 453 can be positioned at a location on the busbars associated with the first electrical power bus 462 that is coupled to the second converter 475, a third switch 454 can be positioned at a location on the busbars associated with the second electrical power bus 472 that is coupled to the first converter 465, and a fourth switch 455 can be positioned at a location on the busbars associated with the second electrical power bus 472 that is coupled to the second converter 475. Switch 456 (e.g., a disconnect switch) can be positioned between and electrically couple the first electrical power bus 462 and the second electrical power bus 472. Switches 452-456 can be variously toggled between first and second positions depending on whether faults are detected within electric power system 450. For example, switch 456 can be configured for operation in a first position (e.g., an open position) during normal steady-state operation of the electric power system 450. Switch 456 can be configured for operation in a second position (e.g., a closed position) during fault operation of the electric power system 450. In this way, power can be provided to both electrical power busses 462 and 472 even in the case of failure of one of the electric machines 460, 470. Fault operation can correspond to operation of the electric power system during a timeframe in which a fault is detected. Faults that would affect operation of one of the electrical power buses 462, 472 could include but are not limited to faults in the connections to electric machines 460, 470, faults internal to an electric machine 460, 470, faults in electrical cables that are part of the first and second electrical channels 461, 471, faults in a power converter 465, 475, or the like.

FIGS. 11-12 depict aspects of the second example electric machine connection configuration 330 of FIG. 7 and the second generator and converter assembly 340 of FIG. 8. However, it should be appreciated that other example electric machine connection configurations (such as but not limited to the first example electric machine connection configuration 310 of FIG. 5 and the third example electric machine connection configuration 350 of FIG. 9) and other example generator and converter assemblies (such as but not limited to the first generator and converter assembly 320 of FIG. 6 and the third generator and converter assembly 360 of FIG. 10) can be employed instead of those depicted in FIGS. 11-12.

Figure 13:
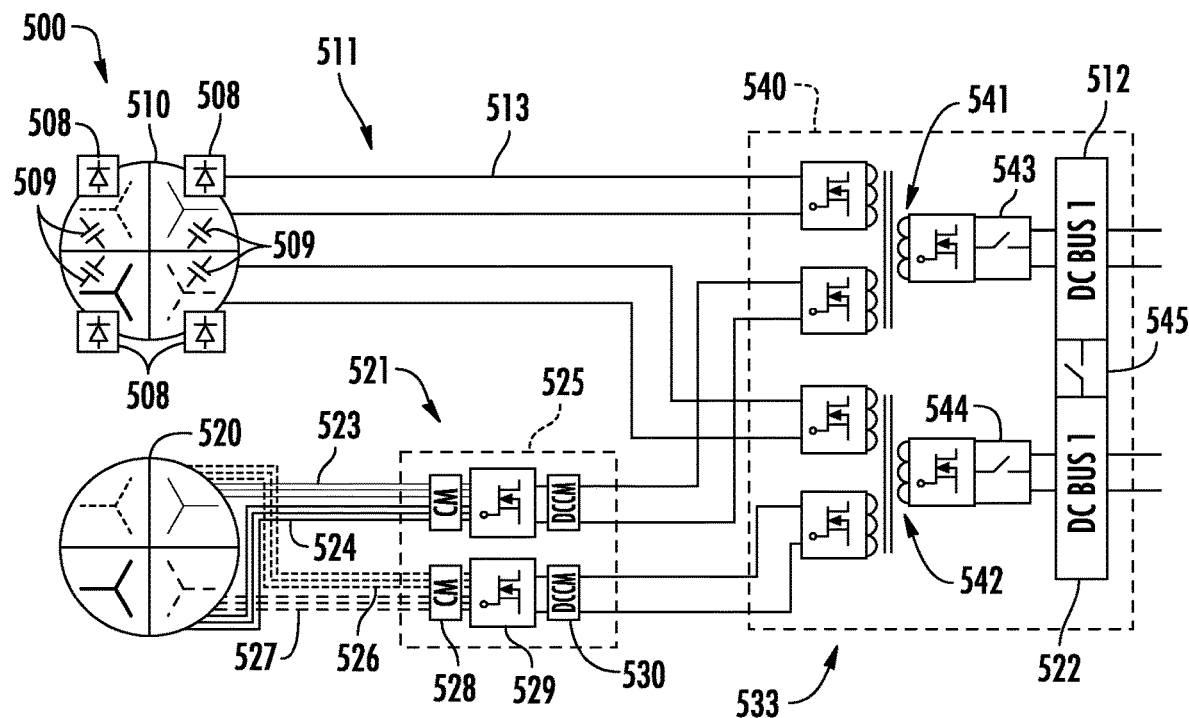
FIG. 13 is a third system-level representation of an electric power system in accordance with an exemplary embodiment of the present disclosure.

FIG. 13 depicts a third electric power system 500 in accordance with an exemplary embodiment of the present disclosure. Electric power system 500 includes a plurality of electric machines. The plurality of electric machines can include at least a first electric machine 510 and a second electric machine 520. In some embodiments, the first electric machine 510 is an LP electric machine or LP generator, such as LP electric machine 146, while the second electric machine 520 is an HP electric machine or HP generator, such as HP electric machine 145. In some examples, first electric machine 510 includes a plurality of diode-rectifiers 508 (e.g., four diode-rectifiers 508), one diode-rectifier 508 being positioned at a terminal connection configuration associated with each winding section of the first electric machine 510. The plurality of diode-rectifiers are configured to rectify the power provided from the first electric machine 510 to the first and second electrical power buses 512, 522. In some examples, first electric machine 510 includes a plurality of AC capacitors 509 (e.g., four AC capacitors 509), one AC capacitor 509 positioned at a terminal connection configuration associated with each winding section of the first electric machine 510. The plurality of AC capacitors 509 are configured to provide reactive power to the first electric machine 510. In some examples, the diode-rectifiers 508 and capacitors 509 are integrated directly within the first electric machine 510, thus providing a passive rectifier assembly for the first electric machine 510.

It will be appreciated that as used herein, the term "integrated" with respect to a converter/rectifier and electric machine may mean that the two components are co-located within a common housing, hermetically sealed together (or at least components thereof hermetically sealed together), utilizing a shared thermal management system or features, or the like.

Third electric power system 500 also includes first and second electrical channels 511 and 521 that are electrically independent from one another. First electrical channel 511 electrically couples the first electric machine 510 to a first electrical power bus 512 and to a second electrical power bus 522. First electrical channel 511 can include a variable DC bus 513 coupling the various wye-connection configurations of first electric machine 510 to a first DC/DC converter 541. The multiple instances of wye-connections within the first electric machine 510 as coupled to the variable DC bus 513 provide first and second independent inverter channels that are magnetically balanced within first electrical channel 511.

Second electrical channel 521 electrically couples the second electric machine 520 to the first electrical power bus 512 and to the second electrical power bus 522. Second electrical channel 521 can also include a converter 525 (e.g., an HP converter) positioned between the second electric machine 520 (e.g., an HP generator) and the first and second electrical power buses 512, 522, thus providing an active rectifier assembly for second electric machine 520. In some examples, converter 525 can be integrated with the second electric machine 520. Second electrical channel 521 can include a first plurality of AC cables 523 coupling respective first wye-connection instances of second electric machine 520 to converter 525, a second plurality of AC cables 524 coupling respective second wye-connection instances of second electric machine 520 to converter 525, a third plurality of AC cables 526 coupling respective third wye-connection instances of second electric machine 520 to converter 525, and a fourth plurality of AC cables 527 coupling respective fourth wye-connection instances of second electric machine 520 to converter 525. The multiple instances of wye-connections within the second electric machine 520 as coupled to the first plurality of AC cables 523, second plurality of AC cables 524, third plurality of AC cables 526, and fourth plurality of AC cables 527 help provide first and second independent inverter channels that are magnetically balanced within second electrical channel 521. In some examples, converter 525 can include one or more common mode filters 528, one or more AC/DC converter circuit elements 529, and one or more DC common mode (DCCM) filters 530. Second electrical channel 521 can include a variable DC bus 533 coupling converter 525 to a second DC/DC converter 542.

Electric power system 500 can also include a power distribution unit (PDU) 540. PDU 540 can include the first electrical power bus 512, the second electrical power bus 522, the first DC/DC converter 541, the second DC/DC converter 542, and various switches 543-545. First DC/DC converter 541 and second DC/DC converter 542 can generally be characterized as high-density low-loss devices that provide high frequency isolation and allow optimum aircraft DC voltage levels to be respectively provided to the first and second electrical power buses 512, 522. In some implementations, the first DC/DC converter 541 and/or the second DC/DC converter 542 can be isolated DC/DC converters having two or more respective DC terminals. In some implementations, one or more of the DC/DC converter(s) 541, 542 can be configured to additionally or alternatively operate as a fast-acting DC breaker.

A first switch 543 is positioned between an output of first DC/DC converter 541 and the first electrical power bus 512. A second switch 544 is positioned between an output of second DC/DC converter 542 and the second electrical power bus 522. Switch 545 (e.g., a disconnect switch) is positioned between and electrically couples the first electrical power bus 512 and the second electrical power bus 522. Switches 543-545 can be variously toggled between first and second positions depending on whether faults are detected within electric power system 500. For example, switch 545 can be configured for operation in a first position (e.g., an open position) during normal steady-state operation of the electric power system 500. Switch 545 can be configured for operation in a second position (e.g., a closed position) during fault operation of the electric power system 500. Fault operation can correspond to operation of the electric power system during a timeframe in which a fault is detected. In this way, power can be provided to both electrical power busses 512 and 522 even in the case of failure of one of the electric machines 510, 520. Faults that would affect operation of one of the electrical power buses 512, 522 could include but are not limited to faults in the connections to electric machines 510, 520, faults internal to an electric machine 510, 520, faults in electrical cables that are part of the first and second electric electrical channels 511, 521, faults in a power converter 525, or the like.

Figure 14:
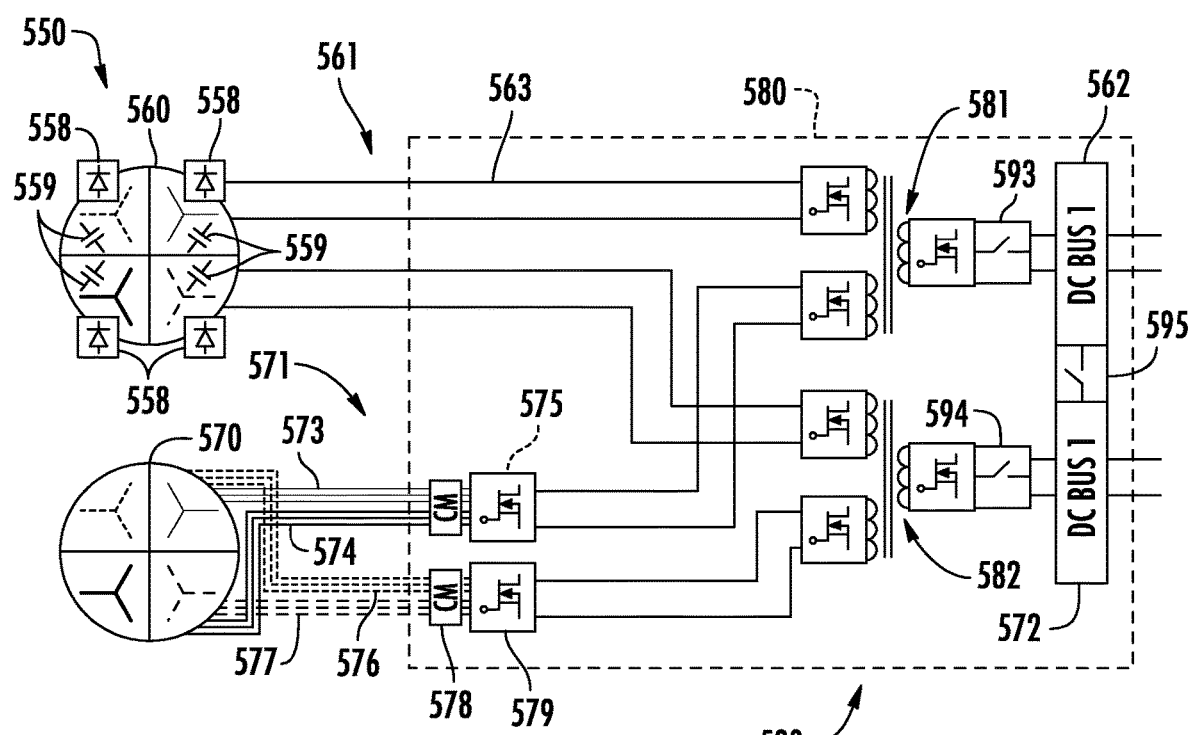
FIG. 14 is a fourth system-level representation of an electric power system in accordance with an exemplary embodiment of the present disclosure.

FIG. 14 depicts a fourth electric power system 550 in accordance with an exemplary embodiment of the present disclosure. Electric power system 550 includes a plurality of electric machines. The plurality of electric machines can include at least a first electric machine 560 and a second electric machine 570. In some embodiments, the first electric machine 560 is an LP electric machine or LP generator, such as LP electric machine 146, while the second electric machine 570 is an HP electric machine or HP generator, such as HP electric machine 145. In some examples, first electric machine 560 includes a plurality of diode-rectifiers 558 (e.g., four diode-rectifiers 558), one diode-rectifier 558 being positioned at a terminal connection configuration associated with each winding section of the first electric machine 560. The plurality of diode-rectifiers are configured to rectify the power provided from the first electric machine 560 to the first and second electrical power buses 562, 572. In some examples, first electric machine 560 includes a plurality of AC capacitors 559 (e.g., four AC capacitors 559), one AC capacitor 559 positioned at a terminal connection configuration associated with each winding section of the first electric machine 560. The plurality of AC capacitors 559 are configured to provide reactive power to the first electric machine 560. In some examples, the diode-rectifiers 558 and capacitors 559 are integrated directly within the first electric machine 560, thus providing a passive rectifier assembly for the first electric machine 560.

Fourth electric power system 550 also includes first and second electrical channels 561 and 571 that are electrically independent from one another. First electrical channel 561 electrically couples the first electric machine 560 to a first electrical power bus 562 and to a second electrical power bus 572. First electrical channel 561 can include a variable DC bus 563 coupling the various wye-connection configurations of first electric machine 560 to a first DC/DC converter 581 and second DC/DC converter 582. The multiple instances of wye-connections within the first electric machine 560 as coupled to the variable DC bus 563 provide first and second independent inverter channels that are magnetically balanced within first electrical channel 561.

Second electrical channel 571 electrically couples the second electric machine 570 to the first electrical power bus 562 and to the second electrical power bus 572. Second electrical channel 571 can also include a converter 575 (e.g., an HP converter) positioned between the second electric machine 570 (e.g., an HP generator) and the first and second electrical power buses 562, 572. Converter 575 can effectively provide an active power rectifier assembly for second electric machine 570. Second electrical channel 571 can include a first plurality of AC cables 573 coupling respective first wye-connection instances of second electric machine 570 to converter 575, a second plurality of AC cables 574 coupling respective second wye-connection instances of second electric machine 570 to converter 575, a third plurality of AC cables 576 coupling respective third wye-connection instances of second electric machine 570 to second converter 575, and a fourth plurality of AC cables 577 coupling respective fourth wye-connection instances of second electric machine 570 to converter 575. The multiple instances of wye-connections within the second electric machine 570 as coupled to the first plurality of AC cables 573, second plurality of AC cables 574, third plurality of AC cables 576, and fourth plurality of AC cables 577 help provide first and second independent inverter channels that are magnetically balanced within second electrical channel 571. In some examples, converter 575 can include one or more common mode filters 578 and one or more AC/DC converter circuit elements 579. Second electrical channel 571 can also include a DC bus 590 coupling the converter 575 to first DC/DC converter 581 and second DC/DC converter 582.

Electric power system 550 can also include a power distribution unit (PDU) 580. PDU 580 can include the converter 575, first electrical power bus 562, second electrical power bus 572, first DC/DC converter 581, second DC/DC converter 582, and various switches 593-595. Notably, the converter 575, first electrical power bus 562, second electrical power bus 572, first DC/DC converter 581, second DC/DC converter 582, and various switches 593-595 are all co-located within PDU 580. For example, the converter 575, first electrical power bus 562, second electrical power bus 572, first DC/DC converter 581, second DC/DC converter 582, and various switches 593-595 can all be mechanically positioned within a same structural housing defining PDU 580.

First DC/DC converter 581 and second DC/DC converter 582 can generally be characterized as high-density low-loss devices that provide high frequency isolation and allow optimum aircraft DC voltage levels to be respectively provided to the first and second electrical power buses 562, 572. In some implementations, the first DC/DC converter 581 and/or the second DC/DC converter 582 can be isolated DC/DC converters having two or more respective DC terminals. In some implementations, one or more of the DC/DC converter(s) 581, 582 can be configured to additionally or alternatively operate as a fast-acting DC breaker.

Comparing fourth electric power system 550 of FIG. 14 to the third electric power system 500 of FIG. 13, co-location of components within PDU 580 enables elimination or reduction of some components (e.g., connector cables). Component reduction can advantageously reduce size and weight of the power system, which can be especially desirable for aircraft applications. For instance, variable DC bus cables in third electric power system 500 of FIG. 13 connecting the first electric machine 510 to the first and second electrical power buses 512, 522 can be reduced in the second electric power system 550 of FIG. 14. DCCM filters 530 in converter 525 of third electric power system 500 can also be removed in the fourth electric power system 550 of FIG. 14. Elimination and/or reduction of the DC cables and DCCM filters can also advantageously reduce DC capacitance within the second electric power system 550, provide a common thermal interface within PDU 580, and increase overall volumetric power density within second electric power system 550.

Referring still to FIG. 14, first switch 593 is positioned between an output of first DC/DC converter 581 and the first electrical power bus 562. Second switch 594 is positioned between an output of second DC/DC converter 582 and the second electrical power bus 572. Switch 595 (e.g., a disconnect switch) is positioned between and electrically couples the first electrical power bus 562 and the second electrical power bus 572. Switches 593-595 can be variously toggled between first and second positions depending on whether faults are detected within electric power system 550. For example, switch 595 can be configured for operation in a first position (e.g., an open position) during normal steady-state operation of the electric power system 550. Switch 595 can be configured for operation in a second position (e.g., a closed position) during fault operation of the electric power system 550. Fault operation can correspond to operation of the electric power system during a timeframe in which a fault is detected. Faults that would affect operation of one of the electrical power buses 562, 572 could include but are not limited to faults in the connections to electric machines 560, 570, faults internal to an electric machine 560, 570, faults in electrical cables that are part of the first and second electric electrical channels 561, 571, faults in a power converter 575, or the like.

Comparing the electric power systems 500, 550 of FIGS. 13-14 to the electric power systems 400, 450 of FIGS. 11-12 reveal the elimination of a converter within one of the electrical channels. For example, first electrical channel 511 of electric power system 500 and first electrical channel 561 of electric power system 550 can respectively eliminate a converter (such as first converter 415 of the first electric power system 400 of FIG. 11 or first converter 465 of the second electric power system 450 of FIG. 12). Elimination of this LP converter capitalizes on a dynamic of some engine configurations whereby LP generator pushes power but does not absorb power. In keeping with such an operational configuration, power is always transferred from the LP generator to the HP generator. So at any point in time, the LP is never absorbing power but always pushing power out. This is in contrast with the HP generator which is typically configured to run in both motor/generator modes. Under starting conditions, the HP electric machine will run as a motor and then it will start generating power. By assuming that power transfer always happens from LP to HP, the LP active converter can be eliminated, and instead power can be rectified at the LP generator directly, providing a configuration that is even more power dense, reliable, and affordable. This can be accomplished at least in part by positioning capacitor-diode rectifiers at the terminals of the LP electric machine.

FIGS. 13-14 depict aspects of the first example electric machine connection configuration 310 of FIG. 5 and the first generator and converter assembly 320 of FIG. 6. However, it should be appreciated that other example electric machine connection configurations (such as but not limited to the second example electric machine connection configuration 330 of FIG. 7 and the third example electric machine connection configuration 350 of FIG. 9) and other example generator and converter assemblies (such as but not limited to the second generator and converter assembly 340 of FIG. 8 and the third generator and converter assembly 360 of FIG. 10) can be employed instead of those depicted in FIGS. 13-14.

Figure 15:
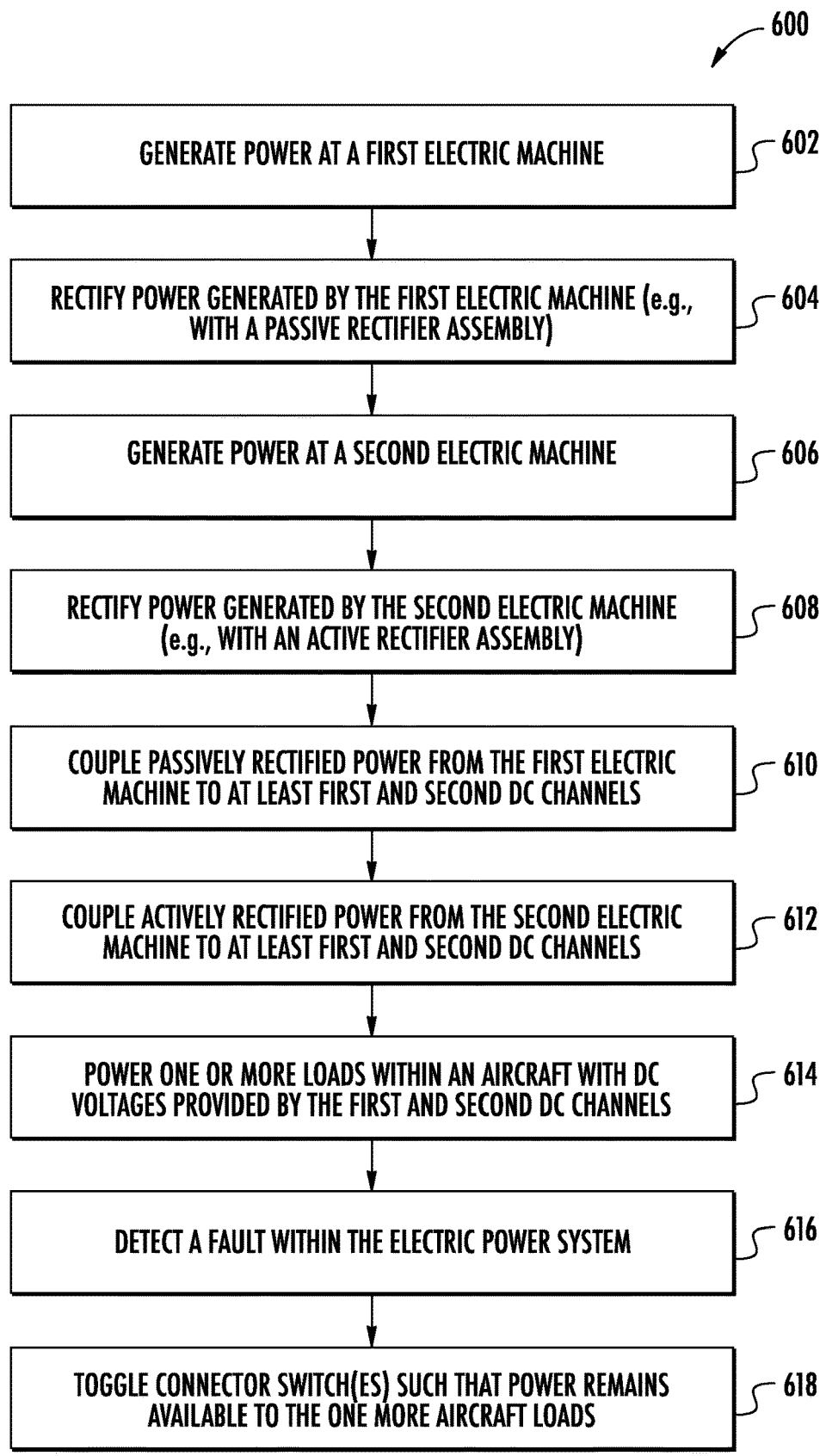
FIG. 15 is a flow chart of a method for generating electric power for an aircraft in accordance with an exemplary embodiment of the present disclosure.

Referring now to FIG. 15, an example method 600 for generating electric power for an aircraft in accordance with an exemplary embodiment of the present disclosure is depicted. At (602), method 600 can include generating power at a first electric machine. In some examples, generating power at (602) can include generating a first power flow at an LP generator. In some examples, the LP generator configured to generate the first power flow at (602) can include a plurality of multi-phase windings that are substantially magnetically decoupled and that is mechanically balanced even if one of the plurality of windings is de-energized. In some examples, the LP generator configured to generate first power flow at (602) includes multi-phase windings that are tooth-wound and/or that are spatially distributed in a magnetic core (e.g., in stators of the magnetic core) of the LP generator. In some examples, the LP generator can include first and second multi-phase winding sections, each multi-phase winding section including three terminals for three-phase electric power. In some examples, the LP generator can include a plurality of coupled multi-phase winding pairs and six terminals for delivering six-phase electric power from the plurality of coupled multi-phase winding pairs. In some examples, the LP generator can include first, second, third, and fourth multi-phase winding sections, each multi-phase winding section including three terminals for three-phase electric power.

At (604), method 600 can include rectifying power generated by the first electric machine at (602). For instance, a first converter (e.g., an LP converter) can be used to rectify power at (604). In some examples, rectifying power at (604) can include passively rectifying the first power flow generated by the LP generator at (602). For instance, power rectified at (604) can be rectified using a plurality of diode-rectifiers configured to rectify the power provided from an LP generator. The plurality of diode-rectifiers can be physically integrated with the LP generator. In some examples, a plurality of AC capacitors are also physically integrated into the LP generator to help provide reactive power to the LP generator.

At (606), method 600 can include generating power at a second electric machine. In some examples, generating power at (606) can include generating a second power flow at an HP starter-generator. In some examples, the HP starter-generator configured to generate second power flow at (606) can include a plurality of multi-phase windings that are substantially magnetically decoupled and that is mechanically balanced even if one of the plurality of windings is de-energized. In some examples, the HP starter-generator configured to generate second power flow at (606) can include multi-phase windings that are tooth-wound and/or that are spatially distributed in a magnetic core (e.g., in stators of the magnetic core) of the HP starter-generator. In some examples, the HP starter-generator can include first and second multi-phase winding sections, each multi-phase winding section including three terminals for three-phase electric power. In some examples, the HP starter-generator can include a plurality of coupled multi-phase winding pairs and six terminals for delivering six-phase electric power from the plurality of coupled multi-phase winding pairs. In some examples, the HP starter-generator can include first, second, third, and fourth multi-phase winding sections, each multi-phase winding section including three terminals for three-phase electric power.

At (608), method 600 can include rectifying power generated by the second electric machine at (604). For instance, a second converter (e.g., an HP converter) can be used to rectify power at (608). In some examples, rectifying power at (608) can include actively rectifying the second power flow generated by the HP starter-generator.

At (610), method 600 can include coupling passively rectified power from the LP generator to at least first and second DC channels. In some examples, the first and second DC channels are formed at least in part by first and second electrical power buses that are respectively coupled to the LP generator. The first and second DC channels to which passively rectified power are coupled at (610) can be formed at least in part by the first electrical power bus and the second electrical power bus. In some examples, the first and second electrical channels can additionally include an isolated DC/DC converter coupling the LP generator to the first and second electrical power buses. Such a DC/DC converter can include two or more DC terminals, and can be configured to additionally or alternatively operate as a fast-acting DC breaker.

At (612), method 600 can include coupling actively rectified power from the HP generator to the at least first and second DC channels. In some examples, the first and second DC channels are formed at least in part by first and second electrical power buses that are respectively coupled to the HP starter-generator. The first and second DC channels to which actively rectified power are coupled at (612) can be formed at least in part by the first electrical power bus and the second electrical power bus. In some examples, the first and second electrical channels can additionally include an isolated DC/DC converter coupling the HP starter-generator to the first and second electrical power buses. Such a DC/DC converter can include two or more DC terminals, and can be configured to operate as a fast-acting DC breaker.

At (614), method 600 can include powering one or more loads within a vehicle (e.g., an aircraft) with DC voltages provided by the first and second DC channels. In some implementations, the one or more vehicle loads powered at (614) can correspond to aircraft loads such as one or more engine electrical loads such as but not limited to fuel pump(s), cooling pump(s) and engine icing protection, one or more environmental control systems such as but not limited to systems for cabin pressurization, cabin air-conditioning, and the like, flight control electrified actuators, avionics, wing icing protection, and other systems requiring DC power within an aircraft. The first and second DC channels used to power one or more loads at (614) can be regulated or unregulated. The voltage levels provided by the first and second DC channels can be fixed or they can be varied (e.g., varied among two or more voltage values). The multiple DC channels used to power one or more loads at (614) can be configured to carry electrical power having a bi-polar voltage of between about +/−270 volts and about +/−2400 volts.

At (616), method 600 can include detecting a fault within the electric power system resulting in power (e.g., the electric power coupled at (610) and/or (612)) being unavailable at the first and second DC channels (e.g., at first and second electrical power buses forming in part the first and second DC channels). In response to a fault being detected at (616), a connector switch positioned between the first electrical power bus and the second electrical power bus can be toggled at (618) such that power remains available to the one or more loads despite the fault. In some examples, only a portion of the power coupled at (610) and (612) is available to the aircraft loads when the connector switch is toggled at (618). However, the portion should be sufficient to allow many of the various electric machine operating modes to continue functioning. As such, even while operating under fault conditions, an aircraft can have enough power to safely finish a mission, cruise to a destination, and safely land despite encountering a fault.

When the electric power system that generates electric power in method 600 is operating under normal steady-state conditions, the one or more aircraft loads are powered by both first and second electrical power buses. When a fault is detected, the electric propulsion assembly is powered by one of the first and second electrical power buses, while the other electrical power bus is disconnected.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects of the invention are provided by the subject matter of the following clauses:

A vehicle electric power system comprising: at least first and second electric machines, each electric machine comprising a plurality of multi-phase windings that are substantially magnetically decoupled, and wherein each electric machine is mechanically balanced even if one of the plurality of windings is de-energized; a first electrical channel coupling the first electric machine to a first electrical power bus and to a second electrical power bus; and a second electrical channel coupling the second electric machine to the first electrical power bus and to the second electrical power bus; wherein multiple DC channels for the vehicle electric power system are formed at least in part by the first electrical power bus and the second electrical power bus.

The vehicle electric power system of one or more of these clauses, wherein the plurality of multi-phase windings are tooth-wound and spatially distributed around each electric machine.

The vehicle electric power system of one or more of these clauses, further comprising: a switch positioned between and electrically coupling the first electrical power bus and the second electrical power bus, wherein the switch is configured for operation in a first position during normal steady-state operation of the vehicle electric power system, and wherein the switch is configured for operation in a second position during fault operation of the vehicle electric power system.

The vehicle electric power system of one or more of these clauses, wherein: the at least first and second electric machines respectively comprise first and second multi-phase winding sections, each multi-phase winding section comprising terminals for multi-phase electric power; the first electrical channel comprises first and second parallel connections to the terminals of the first multi-phase winding section; and the second electrical channel comprises third and fourth parallel connections to the terminals of the second multi-phase winding section.

The vehicle electric power system of one or more of these clauses, wherein: the at least first and second electric machines respectively comprise a plurality of coupled multi-phase winding pairs and terminals for delivering multi-phase electric power from the plurality of coupled multi-phase winding pairs; the first electrical channel comprises first and second parallel connections to the terminals of the plurality of coupled multi-phase winding pairs; and the second electrical channel comprises third and fourth parallel connections to the terminals of the plurality of coupled multi-phase winding pairs.

The vehicle electric power system of one or more of these clauses, wherein: the at least first and second electric machines respectively comprise first, second, third, and fourth multi-phase winding sections, each multi-phase winding section comprising terminals for multi-phase electric power; the first electrical channel comprises a first connection to the terminals of the first multi-phase winding section and a second connection to the terminals of the second multi-phase winding section; the second electrical channel comprises a third connection to the terminals of the third multi-phase winding section and a fourth connection to the terminals of the fourth multi-phase winding section.

The vehicle electric power system of one or more of these clauses, wherein at least one of the first, second, third, and fourth multi-phase winding sections is wye-connected and at least another one of the first, second, third, and fourth multi-phase winding sections is delta-connected.

The vehicle electric power system of one or more of these clauses, wherein: the first electrical channel comprises a first converter coupling the first electric machine to the first electrical power bus and to a second electrical power bus; the second electrical channel comprises a second converter coupling the second electric machine to the first electrical power bus and to the second electrical power bus; and the vehicle electric power system comprises one or more switches configured for operation in a first position during normal steady-state operation of the vehicle electric power system and in a second position during fault operation of the vehicle electric power system.

The vehicle electric power system of one or more of these clauses, wherein the first converter, the second converter, and the one or more switches are co-located in a power distribution unit.

The vehicle electric power system of one or more of these clauses, wherein: the first and second electric machines are configured for use in a gas turbine engine comprising a low pressure turbine and a low pressure compressor rotatable with one another through a low pressure shaft and a high pressure turbine and a high pressure compressor rotatable with one another through a high pressure shaft; the first electric machine is rotatable with the low pressure (LP) shaft; and the second electric machine is rotatable with the high pressure (HP) shaft.

The vehicle electric power system of one or more of these clauses 0, wherein the first electric machine comprises: a plurality of diode-rectifiers configured to rectify the power provided from the first electric machine to the first and second electrical power buses; and a plurality of AC capacitors at terminals of the first electric machine, the AC capacitors configured to provide reactive power to the first electric machine; and wherein the diode-rectifiers and the plurality of AC capacitors are physically integrated with the first electric machine.

The vehicle electric power system of one or more of these clauses, wherein the first and second electrical channels comprise an isolated DC/DC converter coupling the first electric machine to the first and second electrical power buses and coupling the second electric machine to the first and second electrical power buses, wherein the DC/DC converter comprises two or more DC terminals.

The vehicle electric power system of one or more of these clauses, wherein the DC/DC converter operates as a fast-acting DC breaker.

The vehicle electric power system of one or more of these clauses, wherein the DC/DC converter, a portion of the first electrical power bus, and a portion of the second electrical power bus are co-located in a power distribution unit.

The vehicle electric power system of one or more of these clauses, wherein the multiple DC channels are configured to carry electrical power having a bi-polar voltage of between about +/−270 volts and about +/−2400 volts, or unipolar voltage of between about 270 volts and about 4800 volts.

The vehicle electric power system of one or more of these clauses, wherein the multiple DC channels are configured to carry electrical power having a bi-polar or unipolar voltage of between 270 and 800, below 270, between 600 and 1200, about 800, about 1200, between 800 and 1600, between 1200 and 2400, about 1600, about 2600, about 3000, between 2400 and 3000, about 4800, between 3000 and 4800, and/or above 4800 volts.

A vehicle electric power system comprising: a gas turbine engine comprising a low pressure turbine and a low pressure compressor rotatable with one another through a low pressure shaft and a high pressure turbine and a high pressure compressor rotatable with one another through a high pressure shaft; an LP electric machine that is rotatable with the low pressure shaft, wherein the LP electric machine comprises a passive rectifier assembly for providing a first power flow; an HP electric machine that is rotatable with the high pressure shaft, wherein the HP electric machine is coupled to an active rectifier assembly for providing a second power flow.

The vehicle electric power system of one or more of these clauses, wherein the passive rectifier assembly comprises: a plurality of diode-rectifiers configured to rectify the power provided from the LP electric machine; and a plurality of AC capacitors at terminals of the LP electric machine, the AC capacitors configured to provide reactive power to the LP electric machine; and wherein the diode-rectifiers and the plurality of AC capacitors are physically integrated with the LP electric machine.

The vehicle electric power system of one or more of these clauses, wherein each of the LP electric machine and the HP electric machine comprises a plurality of multi-phase windings that are substantially magnetically decoupled, and wherein each electric machine is mechanically balanced even if one of the plurality of windings is de-energized.

The vehicle electric power system of one or more of these clauses, comprising: a first electrical channel coupling the first power flow from the LP electric machine to a first electrical power bus and to a second electrical power bus; and a second electrical channel coupling the second power flow from the HP electric machine to the first electrical power bus and to the second electrical power bus; and wherein multiple DC channels for the vehicle electric power system are formed at least in part by the first electrical power bus and the second electrical power bus.

The vehicle electric power system of one or more of these clauses, wherein the multiple DC channels are configured to carry electrical power having at least first and second bi-polar voltages operating at one or more of same voltage levels and different voltage levels.

A method for generating electric power for a vehicle comprising: generating a first power flow at a first electric machine; passively rectifying the first power flow generated by the first electric machine; generating a second power flow at a second electric machine; actively rectifying the second power flow generated by the second electric machine; coupling passively rectified first power from the first electric machine to at least first and second DC channels; coupling actively rectified second power from the second electric machine to the at least first and second DC channels; and powering one or more loads within a vehicle with DC voltages provided by the first and second DC channels.

A vehicle electric power system comprising: at least one electric machine comprising a plurality of tooth-wound multi-phase windings that are substantially magnetically decoupled, wherein the at least one electric machine is mechanically balanced even if one of the plurality of windings is de-energized; one or more power rectifiers for producing rectified power from the power generated by the at least one electric machine; a plurality of electrical power busses formed after the at least one power rectifier, the plurality of electrical power busses configured to provide DC power to one or more loads within a vehicle.

The vehicle electric power system of one or more of these clauses, wherein the plurality of tooth-wound multi-phase windings comprises a first plurality of windings configured for generating power associated with a first current and a second plurality of windings configured for generating power associated with a second current, wherein the first current is different than the second current.

The vehicle electric power system of one or more of these clauses, wherein: the one or more power rectifiers comprises an active power rectifier and a passive power rectifier; the plurality of tooth-wound multi-phase windings comprises a first plurality of windings coupled to the active power rectifier and a second plurality of windings coupled to the passive power rectifier.

The vehicle electric power system of one or more of these clauses, wherein the one or more power rectifiers comprises: a plurality of diode-rectifiers configured to rectify the power provided from the at least one electric machine; a plurality of AC capacitors at terminals of the at least one electric machine, the AC capacitors configured to provide reactive power to the at least one electric machine; and wherein the diode-rectifiers and the plurality of AC capacitors are physically integrated with the at least one electric machine.

The vehicle electric power system of one or more of these clauses, wherein the DC power provided by the plurality of electrical power busses is regulated at fixed voltage values.

The vehicle electric power system of one or more of these clauses, wherein the DC power provided by the plurality of electrical power busses is varied among two or more voltage values.

The vehicle electric power system of one or more of these clauses, wherein the plurality of electrical power busses are configured to carry electrical power having a bi-polar voltage of between about +/−270 volts and about +/−2400 volts, or unipolar voltage of between about 270 volts and about 4800 volts.

The vehicle electric power system of one or more of these clauses, wherein the multiple DC channels are configured to carry electrical power having a bi-polar or unipolar voltage of between 270 and 800, below 270, between 600 and 1200, about 800, about 1200, between 800 and 1600, between 1200 and 2400, about 1600, about 2600, about 3000, or between 2400 and 3000, about 4800, or between 3000 and 4800, and/or above 4800 volts.

The vehicle electric power system of one or more of these clauses, wherein the at least one electric machine comprises first and second multi-phase winding sections, each multi-phase winding section comprising terminals for multi-phase electric power.

The vehicle electric power system of one or more of these clauses, wherein the at least one electric machine comprises a plurality of coupled multi-phase winding pairs and terminals for delivering multi-phase electric power from the plurality of coupled multi-phase winding pairs.

The vehicle electric power system of one or more of these clauses, wherein the at least one electric machine comprises first, second, third, and fourth multi-phase winding sections, each multi-phase winding section comprising terminals for multi-phase electric power.

A vehicle electric power system of one or more of these clauses utilizing a method for generating electric power for a vehicle of one or more of these clauses.

A method for generating electric power for a vehicle of one or more of these clauses utilizing a vehicle electric power system of one or more of these clauses.

A method for generating electric power for a vehicle of one or more of these clauses using any of the embodiments according to FIGS. 5 through 14 and accompanying description.

An electric power system for a vehicle of one or more of these clauses according to any of the embodiments shown in FIGS. 5 through 14 and accompanying description.

A vehicle electric power system of one or more of these clauses wherein the vehicle is an aircraft.

What is claimed is:

1. A method for generating electric power with an electrical power system for a vehicle, comprising:
    generating a first power flow at a first electric machine;
    rectifying the first power flow generated by the first electric machine;
    generating a second power flow at a second electric machine;
    rectifying the second power flow generated by the second electric machine;
    coupling rectified first power from the first electric machine to at least first and second DC channels;
    coupling rectified second power from the second electric machine to the at least first and second DC channels;
    powering one or more loads within a vehicle with DC voltages provided by the first and second DC channels;
    detecting a fault resulting in electric power being unavailable at the first and second DC channels; and
    in response to the fault being detected, toggling a connector switch such that electric power remains available to one or more loads of the vehicle.

2. The method of claim 1, wherein the first electric machine is driven by a first shaft of a gas turbine engine and the second electric machine is driven by a second shaft of the gas turbine engine.

3. The method of claim 2, wherein the first shaft is a low pressure shaft and the second shaft is a high pressure shaft.

4. The method of claim 1, wherein the first power flow generated by the first electric machine is passively rectified.

5. The method of claim 1, wherein the second power flow generated by the second electric machine is actively rectified.

6. The method of claim 1, wherein only a portion of the first power coupled to the at least first and second DC channels is available to the one or more loads of the vehicle when the connector switch is toggled.

7. The method of claim 1, wherein only a portion of the second power coupled to the at least first and second DC channels is available to the one or more loads of the vehicle when the connector switch is toggled.

8. The method of claim 1, wherein prior to detecting the fault, the electrical power system is operating under normal steady-state conditions in which the one or more loads are powered by both first and second electrical power buses that respectively form in part the first and second DC channels.

9. The method of claim 8, wherein when the fault is detected, the one or more loads are powered by one of the first and second electrical power buses, while the other electrical power bus is disconnected.

10. The method of claim 1, wherein the at least first and second DC channels are coupled to first and second electrical power buses through an isolated DC/DC converter.

11. The method of claim 1, wherein the at least first and second DC channels are configured to carry electrical power having a bi-polar voltage of between about +/−270 volts and about +/−2400 volts, or a unipolar voltage of between about 270 volts and about 4800 volts.

12. A generator and converter assembly comprising:
    an electric machine comprising a first star-configuration connection and a second star-configuration connection, wherein each of the first star-configuration connection and the second star-configuration connection comprise at least two connector instances;
    a first set of AC cables electrically coupling the at least two connector instances of the first star-configuration connection;
    a second set of AC cables electrically coupling the at least two connector instances of the second star-configuration connection; and
    a converter electrically coupled to both the first set of AC cables and the second set of AC cables.

13. The generator and converter assembly of claim 12, wherein the converter is an active power rectifier assembly.

14. The generator and converter assembly of claim 12, wherein the converter is a passive power rectifier assembly.

\* \* \* \* \*